United States Patent [19]
Wiley et al.

[11] Patent Number: 6,137,800
[45] Date of Patent: Oct. 24, 2000

[54] SYSTEM AND METHOD FOR CONNECTING A CALL

[75] Inventors: William Lyle Wiley, Olathe; Michael Joseph Gardner, Overland Park; Tracy Lee Nelson, Shawnee Mission, all of Kans.; Royal Dean Howell, Trimble; Albert Daniel DuRee, Independence, both of Mo.

[73] Assignee: Sprint Communications Company, L. P., Kansas City, Mo.

[21] Appl. No.: 08/854,194

[22] Filed: May 9, 1997

[51] Int. Cl.[7] .................................................... H04L 12/28
[52] U.S. Cl. ....................... 370/396; 370/258; 370/385; 370/689; 370/395; 370/396; 370/397; 370/440; 370/401; 370/403; 370/404; 370/405; 370/409; 370/465; 370/466; 370/474; 370/522; 370/535
[58] Field of Search ..................... 370/258, 385, 370/389, 395, 396, 397, 400, 401, 403, 404, 405, 409, 465, 466, 474, 522, 535, 236, 410, 498, 905, 907; 359/115, 119

[56] References Cited

U.S. PATENT DOCUMENTS

| | | |
|---|---|---|
| 4,201,889 | 5/1980 | Lawrence et al. . |
| 4,310,727 | 1/1982 | Lawser . |
| 4,348,554 | 9/1982 | Asmuth . |
| 4,453,247 | 6/1984 | Suzuki et al. . |
| 4,554,659 | 11/1985 | Blood et al. . |
| 4,565,903 | 1/1986 | Riley . |
| 4,683,563 | 7/1987 | Rouse et al. . |
| 4,730,312 | 3/1988 | Johnson . |
| 4,736,364 | 4/1988 | Basso et al. . |
| 4,748,658 | 5/1988 | Gopal . |
| 4,823,338 | 4/1989 | Chan et al. . |
| 4,853,955 | 8/1989 | Thorn et al. . |
| 4,896,319 | 1/1990 | Lidinsky et al. . |
| 4,916,690 | 4/1990 | Barri . |
| 4,926,416 | 5/1990 | Weik . |
| 4,985,889 | 1/1991 | Frankish et al. . |
| 4,991,204 | 2/1991 | Yamamoto et al. . |
| 4,993,104 | 2/1991 | Gordon . |
| 5,003,584 | 3/1991 | Benyacar . |

(List continued on next page.)

FOREIGN PATENT DOCUMENTS

| | | |
|---|---|---|
| 90312739 | 7/1991 | European Pat. Off. . |
| 91303312 | 10/1991 | European Pat. Off. . |
| 91311342 | 7/1992 | European Pat. Off. . |
| 0539016 A2 | 4/1993 | European Pat. Off. . |
| 92307752 | 9/1993 | European Pat. Off. . |
| 870284896 | 5/1989 | Japan . |
| 07050057 | 9/1996 | Japan . |
| WO94/06251 | 3/1994 | WIPO . |
| WO95/04436 | 2/1995 | WIPO . |

OTHER PUBLICATIONS

Chase, "Voice And Telephony Over ATM Meeting Report Toronto, Canada Aug. 7–11, 1995", ATM Forum Technical Committee 95–1109, Oct. 2–6, 1995.

(List continued on next page.)

*Primary Examiner*—Ricky Ngo
*Attorney, Agent, or Firm*—Harley R. Hall

[57] ABSTRACT

A system and method connects a call in a broadband system using the asynchronous transfer mode protocol for switching. Calls are connected over a SONET ring that has SONET multiplexers coupled by SONET paths. The SONET multiplexers are adapted to add calls to, and drop calls from, the SONET ring. An ATM cross connect system that has ATM cross connect devices is coupled to the SONET ring. The ATM cross connect devices provide provisioned ATM connections over the SONET ring. ATM interworking units are coupled to the ATM cross connect system. The ATM interworking units interwork calls with selected ATM connections in response to control messages. The selected ATM connections are provisioned between the ATM interworking units by the ATM cross connect system over the SONET ring. A signaling processor system receives call signaling for the calls, processes the call signaling to select the ATM connections for the calls, and sends the control messages to the selected ATM interworking units. The control messages designate the selected ATM connections.

51 Claims, 9 Drawing Sheets

U.S. PATENT DOCUMENTS

| | | |
|---|---|---|
| 5,018,191 | 5/1991 | Catron et al. . |
| 5,048,081 | 9/1991 | Gavaras . |
| 5,058,104 | 10/1991 | Yonehara et al. . |
| 5,067,123 | 11/1991 | Hyodo et al. . |
| 5,084,867 | 1/1992 | Tachibana et al. . |
| 5,089,954 | 2/1992 | Rago . |
| 5,091,903 | 2/1992 | Schrodi . |
| 5,101,404 | 3/1992 | Kunimoto et al. . |
| 5,115,431 | 5/1992 | Williams et al. . |
| 5,163,057 | 11/1992 | Grupp . |
| 5,168,492 | 12/1992 | Beshai et al. . |
| 5,185,743 | 2/1993 | Murayama . |
| 5,193,110 | 3/1993 | Jones et al. . |
| 5,204,857 | 4/1993 | Obara . |
| 5,216,669 | 6/1993 | Hofstetter et al. . |
| 5,218,602 | 6/1993 | Grant et al. . |
| 5,231,631 | 7/1993 | Buhrke et al. . |
| 5,231,633 | 7/1993 | Hluchyj et al. . |
| 5,233,607 | 8/1993 | Barwig et al. . |
| 5,239,539 | 8/1993 | Uchida et al. . |
| 5,249,178 | 9/1993 | Kurano et al. . |
| 5,251,255 | 10/1993 | Epley . |
| 5,253,247 | 10/1993 | Hirose et al. . |
| 5,255,266 | 10/1993 | Watanabe et al. . |
| 5,258,752 | 11/1993 | Fukaya et al. . |
| 5,258,979 | 11/1993 | Oomuro et al. . |
| 5,268,895 | 12/1993 | Topper . |
| 5,271,010 | 12/1993 | Miyake . |
| 5,274,680 | 12/1993 | Sorton et al. . |
| 5,278,889 | 1/1994 | Papanicolaou et al. . |
| 5,282,244 | 1/1994 | Fuller et al. . |
| 5,285,441 | 2/1994 | Bansal et al. . |
| 5,291,479 | 3/1994 | Vaziri et al. . |
| 5,306,318 | 4/1994 | Bachhuber et al. . |
| 5,311,509 | 5/1994 | Heddes et al. . |
| 5,317,562 | 5/1994 | Nardin et al. . |
| 5,323,389 | 6/1994 | Bitz et al. . |
| 5,327,421 | 7/1994 | Hiller et al. . |
| 5,327,433 | 7/1994 | Hall . |
| 5,329,308 | 7/1994 | Binns et al. . |
| 5,339,318 | 8/1994 | Tanaka . |
| 5,345,443 | 9/1994 | D'Ambrogio et al. . |
| 5,345,445 | 9/1994 | Hiller . |
| 5,345,446 | 9/1994 | Hiller . |
| 5,357,510 | 10/1994 | Norizuki et al. . |
| 5,363,433 | 11/1994 | Isono . |
| 5,365,524 | 11/1994 | Hiller et al. . |
| 5,367,566 | 11/1994 | Moe et al. . |
| 5,373,504 | 12/1994 | Tanaka et al. . |
| 5,375,124 | 12/1994 | D'Ambrogio . |
| 5,377,186 | 12/1994 | Wegner . |
| 5,384,771 | 1/1995 | Isidoro et al. . |
| 5,384,840 | 1/1995 | Blatchford et al. . |
| 5,392,402 | 2/1995 | Robrock . |
| 5,394,393 | 2/1995 | Brisson et al. . |
| 5,394,398 | 2/1995 | Rau . |
| 5,414,701 | 5/1995 | Shtayer et al. . |
| 5,418,783 | 5/1995 | Yamaki et al. . |
| 5,420,857 | 5/1995 | Jurkevich . |
| 5,420,858 | 5/1995 | Marshall et al. . |
| 5,420,916 | 5/1995 | Sekiguchi . |
| 5,422,882 | 6/1995 | Hiller . |
| 5,425,090 | 6/1995 | Orriss . |
| 5,426,636 | 6/1995 | Hiller et al. . |
| 5,428,607 | 6/1995 | Hiller et al. . |
| 5,428,609 | 6/1995 | Eng et al. . |
| 5,434,852 | 7/1995 | LaPorta . |
| 5,434,981 | 7/1995 | Lenihan et al. . |
| 5,440,563 | 8/1995 | Isidoro et al. . |
| 5,444,713 | 8/1995 | Backaus et al. . |
| 5,446,738 | 8/1995 | Kim et al. . |
| 5,452,297 | 9/1995 | Hiller et al. . |
| 5,453,981 | 9/1995 | Katsube et al. . |
| 5,454,034 | 9/1995 | Martin . |
| 5,457,684 | 10/1995 | Bharucha . |
| 5,461,669 | 10/1995 | Vilain . |
| 5,463,620 | 10/1995 | Sriram . |
| 5,463,621 | 10/1995 | Suzuki . |
| 5,473,677 | 12/1995 | D'Amato . |
| 5,473,679 | 12/1995 | LaPorta . |
| 5,477,537 | 12/1995 | Dankert et al. . |
| 5,479,401 | 12/1995 | Bitz et al. . |
| 5,479,402 | 12/1995 | Hata et al. . |
| 5,479,495 | 12/1995 | Blumhardt . |
| 5,483,527 | 1/1996 | Doshi et al. . |
| 5,485,455 | 1/1996 | Dobbins et al. . |
| 5,495,484 | 2/1996 | Self et al. ................................ 370/522 |
| 5,504,742 | 4/1996 | Kakuma et al. . |
| 5,506,844 | 4/1996 | Rao . |
| 5,509,010 | 4/1996 | LaPorta . |
| 5,509,123 | 4/1996 | Dobbins et al. . |
| 5,513,178 | 4/1996 | Tanaka . |
| 5,519,707 | 5/1996 | Subramanian et al. . |
| 5,521,910 | 5/1996 | Matthews . |
| 5,522,042 | 5/1996 | Fee et al. . |
| 5,526,414 | 6/1996 | Bedard et al. . |
| 5,533,106 | 7/1996 | Blumhardt . |
| 5,539,698 | 7/1996 | Kozaki et al. . |
| 5,539,815 | 7/1996 | Samba . |
| 5,539,816 | 7/1996 | Pinard et al. . |
| 5,539,884 | 7/1996 | Robrock . |
| 5,541,918 | 7/1996 | Ganmukhi et al. . |
| 5,541,926 | 7/1996 | Saito et al. . |
| 5,544,152 | 8/1996 | Obermanns et al. . |
| 5,544,161 | 8/1996 | Bigham et al. . |
| 5,548,580 | 8/1996 | Buckland . |
| 5,550,819 | 8/1996 | Duault . |
| 5,550,914 | 8/1996 | Clarke et al. . |
| 5,563,939 | 10/1996 | La Porta et al. . |
| 5,566,173 | 10/1996 | Steinbrecher . |
| 5,568,475 | 10/1996 | Doshi . |
| 5,570,368 | 10/1996 | Murakami et al. . |
| 5,577,039 | 11/1996 | Won et al. . |
| 5,579,311 | 11/1996 | Chopping et al. . |
| 5,587,999 | 12/1996 | Endo . |
| 5,592,477 | 1/1997 | Farris et al. . |
| 5,600,640 | 2/1997 | Blair et al. . |
| 5,600,643 | 2/1997 | Robrock . |
| 5,621,728 | 4/1997 | Lightfoot et al. . |
| 5,623,491 | 4/1997 | Skoog . |
| 5,627,836 | 5/1997 | Conoscenti et al. . |
| 5,629,930 | 5/1997 | Beshai et al. . |
| 5,629,938 | 5/1997 | Cerciello et al. ........................ 370/384 |
| 5,635,980 | 6/1997 | Lin et al. . |
| 5,636,210 | 6/1997 | Agrawal et al. . |
| 5,640,446 | 6/1997 | Everett et al. . |
| 5,661,725 | 8/1997 | Buck . |
| 5,666,349 | 9/1997 | Petri . |
| 5,673,262 | 9/1997 | Shimizu . |
| 5,680,390 | 10/1997 | Robrock . |
| 5,703,876 | 12/1997 | Christie . |
| 5,708,702 | 1/1998 | DePaul et al. . |
| 5,710,769 | 1/1998 | Anderson et al. . |
| 5,719,863 | 2/1998 | Hummel . |
| 5,751,706 | 5/1998 | Land . |
| 5,796,813 | 8/1998 | Sonnenberg . |
| 5,802,045 | 9/1998 | Kos . |
| 5,805,568 | 9/1998 | Shinbashi ................................ 370/223 |
| 5,825,780 | 10/1998 | Christie . |
| 5,867,502 | 2/1999 | Chang ................................ 370/477 |
| 5,867,571 | 2/1999 | Borchering . |
| 5,892,764 | 4/1999 | Riemann et al. . |

| | | |
|---|---|---|
| 5,920,412 | 7/1999 | Chang ..................................... 359/128 |
| 5,920,562 | 7/1999 | Christie et al. . |
| 5,940,491 | 8/1999 | Anderson et al. . |
| 5,991,301 | 11/1999 | Christie . |

OTHER PUBLICATIONS

Barr, W.J., et al., The TINA Initiative, IEEE Communications Magazine, vol. 31, No. 3, Mar. 1993, New York (US), pp. 70–76, Mar., 1993.

General Recommendations On Telephone Switching And Signaling Intelligent Network—Intelligent Network Distributed Functional Plane Architecture, Q. 1204, ITU–T Mar., 1993.

General Recommendations On Telephone Switching And Signaling Intelligent Network–Intelligent Network Physical Plane Architecture Q. 1205, ITU–T Recommendation, Telecommunication Standardization Sector of ITU.

McKinney, Scott, "ATM for Narrowband Services" IEEE Communications Magazine, New York, US, pp. 64–72, Apr. 1994.

Beckman, Richard T. and Matthews, Joseph R., "Proposal for a Physical Architecture Based on the Harmonized Functional Architecture," Committee T1 Contribution T1S1.5/95–027, Bellcore, (Feb. 20, 1995).

Yoshikai, N., et al., "Report of the Meeting of SWP 13/1–4 (Draft Recommendation I.580)," ITU–T Telecommunication Standardization Sector, Study Group 13, pp. 1–51, (Mar. 7–18, 1994).

N/A, "Final Draft Text for Broadband Capability Set 2 Signaling Requirements, Attachment "D" Special Drafting Meeting," ITU–T Telecommunications Standardization Sector, Study Group 11, p. 1–127, (Sep. 13–22, 1993).

Ohta, S., et al., "A Dynamically Controllable ATM Transport Network Based on the Virtual Path Concept," Communications for the Information Age, Globecom'88, Conference Record, p. 1272–1276, (Nov. 28–Dec. 1, 1988).

Fukazawa, M., et al., "Intelligent Network Call Model for Broadband ISDN," Fujitsu Laboratories, Ltd. (Japan), p. 30.6.1–30.6.5.

Minzer, Steven, "A Signaling Protocol for Complex Multimedia Services," IEEE Journal on Selected Areas in Communications (ISSN 0733–8716), vol. 9 ( No. 9), p. 1383–1394, (Dec. 1991).

Faynberg, I., et al., "The Support of Network Interworking and Distributed Context Switching in the IN Service Data Function Model," 2nd Colloque International, ICIN 92, p. 11–16, (Mar. 1992).

Woodworth, Clark B., et al., "A Flexible Broadband Packet Switch for a Multimedia Integrated Network," International Conference on Communications, Denver, ICC–91, p. 3.2.1–3.2.8, (Jun. 1991).

Miller, P., "Intelligent Network/2: A flexible framework for exchange services," Bell Communications Research Exchange, vol. 3 ( No. 3), (May/Jun. 1987).

Cooper, C., et al., "Toward a Broadband Congestion Control Strategy," IEEE Network, The Magazine of Computer Communications, (May 1990).

Batten, A., "Personal Communications Services and the Intelligent Network," British Telecommunications Engineering, (Aug. 1990).

Fujioka, M., et al., "Universal Services Creation and Provision Environment for Intelligent Network," IEEE Communications Magazine, (Jan. 1991).

Andrews, F., "Switching in a Competitive Market," IEEE Communications Magazine, (Jan. 1991).

N/A, "Network Signaling," Telephony, TCX12004, University of Excellence, p. 5.8–5.17, (Oct. 21, 1991).

Garrahan, J.J., et al., "Intelligent Network Overview," IEEE Communications Magazine, p. 30–36, (Mar. 1993).

Johnson, M.A., et al., "New Service Testing Functions for Advanced Intelligent Networks," IEEE 1992 Network Operations and Management Symposium, p. 709–720, (Apr. 6, 1992).

Yeh, S.Y., et al., "The Evolving Intelligent Network Architecture," IEEE Conference on Computer and Communication Systems, p. 835–839, (1990).

Atoui, M., "Virtual Private Network Call Processing in the Intelligent Network," International Conference on Communications, p. 561–565, (1992).

Bosco, P., et al., "A Laboratory for AIN Service Design and Validation," International Conference on Communications, p. 566–571, (Jun. 14, 1992).

Homa, J., et al., "Intelligent Network Requirements for Personal Communications Services," IEEE Communications Magazine, p. 70–76, (Feb. 1992).

Russo, E.G., et al., "Intelligent Network Platforms in the U.S.," AT&T Technical Journal, p. 26–43, (1991).

Van Den Broek, W., et al., "RACE 2066–Functional models of UMTS and integration into the future networks," Electronics & Communications Engineering Journal, p. 165–172, (Jun. 1993).

Pinkham, G., et al., "The Ericsson Approach to Intelligent Networks," IEEE Global Telecommunications Conference & Exhibition, Session 10, paragraph 4, p. 320–324, (1988).

N/A, "ANSI–TI.111–1992, Signaling System No. 7 (SS7)—Message Transfer Part (MTP)," American National Standard for Telecommunications.

N/A, "ANSI–TI.112–1992, Signaling System No. 7 (SS7)—Signaling Connection Control Part (SCCP)," American National Standard for Telecommunications.

NA, "ANSI–TI.113–1992, Signaling System No. 7 (SS7)—Integrated Services digital Network (ISDN) User Part," American National Standard for Telecommunications.

N/A, "ANSI–TI.113a–1993, Signaling System No. 7 (SS7)—Integrated Services Digital Network (ISDN) User Part (NxDSO Multi–rate Connection)," American National Standard for Telecommunications.

N/A, "ANSI–TI.113–1995, Signaling System No. 7 (SS7)—Integrated Services Digital Network (ISDN) User Part," American National Standard for Telecommunications.

N/A, "ATM at a Glance," Transmission Technologies Access Guide, p. 40–42, (1993).

Paglialunga, A., "ISCP Baseline Document (VER 3.1)," ITU Telecommunication Standardization Sector, Centre Studi E Laboratori Telecommunicazioni S.p.A., (1993).

N/A, "A Technical Report on Speech Packetization," Document T1A1/94—Prepared by T1A1.7, Working Group on Specialized Signal Processing.

N/A, "Draft Revised Recommendation I.580," ITU—Telecommunication Standardization Sector, Study Group 13, (Jul. 10–21, 1995).

Sprague, David, "MTP Level–3 Gateway STP Release 3.2.0," Tekelec, p. 1–48, (Aug. 4, 1995).

McDysan, David E. and Spohn, Darren L., "ATM Theory and Application," ATM Layer VPI/VCI Level Addressing, p. 256:9.3.1, (1994).

Minoli, Daniel and Dobrowski, George, "Principles of Signaling for Cell Relay and Frame Relay," DVI Comm., Inc. / Stevens Institute of Technology / Bell Comm. Research (Bellcore), p. 1–2, 5–6 and 229, (1994).

N/A, "B–IDSN ATM Adaptation Layer (AAL) Specification, Types 1 & 2," ITU Draft Recommendation I.363.1, (Jul. 21, 1995).

N/A, "Circuit Emulation Service Interoperability Specification Version 2.0 (Baseline Draft), 95–1504," The ATM Forum Technical Committee, (Dec. 1995).

N/A, "IN/B–ISDN Signalling Three Ways of Integration," ITU—Telecommunication Standardization Sector, Study Group 11, (Nov. 29–Dec. 17, 1993).

N/A, "Interworking B–ISUP and Q.93B for DDI, MSN, TP and SUB," ITU—Telecommunication Standardization Sector, Study Group 11, (Nov. 29–Dec. 17, 1993).

N/A, "Revised Draft of Q.2650 (DSS2/B–ISUP Interworking Recommendation)," ITU—Telecommunication Standardization Sector, Study Group 11, (Nov. 19–Dec. 17, 1993).

N/A, "Draft Broadband / Narrowband NNI interworking recommendation," ITU—Telecommunication Standardization Sector, Study Group 11, (Dec. 1993).

N/A, "Draft Recommendation Q.2761," ITU—Telecommunication Standardization Sector, Study Group 11, (Nov. 29–Dec. 17, 1993).

N/A, "Draft Recommendation Q.2762," ITU—Telecommunication Standardization Sector, Study Group 11, (Nov. 29–Dec. 17, 1993).

N/A, "Q.2931 Overview," ITU—Telecommunication Standardization Sector, (Nov. 29–Dec. 17, 1993).

N/A, "Clean final draft text for B–ISUP formats and codes (Q.2763) in ASN.1," ITU—Telecommunication Standardization Sector, Study Group 11, (Nov. 29–Dec. 17, 1993).

N/A, "Updated draft of Q.2764 (BQ.764)," ITU—Telecommunciation Standardization Sector, Study Group 11, (Nov. 29–Dec. 17, 1993).

N/A, "Final B–ISUP SDLs," ITU—Telecommunication Standardization Sector, Study Group 11, (Nov. 29–Dec. 17, 1993).

N/A, "Draft Recommendation Q.2650," ITU—Telecommunication Standardization Sector, Study Group 11, (Nov. 29–Dec. 17, 1993).

N/A, "Revised Draft of Q.2650 (DSS2/B–ISUP Interworking Recommendation)," ITU—Telecommunication Standardization Sector, Study Group 11, (Nov. 29–Dec. 17, 1993).

N/A, "Revision of Recommendation of Q.850," ITU—T SG 11 WP 2, (Dec. 2–15, 1993).

N/A, "Draft Text for Q.2931 (CH. 1,2 and 3)," ITU—Telecommunication Standardization Sector, Study Group 11, (Dec. 1993).

N/A, "Q.2931, Clause 4—Information Elements," ITU—Telecommunication Standardization Sector, (Nov. 29–Dec. 17, 1993).

N/A, "Section 5 of Q.93B," ITU—Telecommunication Standardization Sector, Study Group 11, (Nov. 29–Dec. 17, 1993).

N/A, "Chapter 6 of Recommendation Q.93B," ITU—Telecommunication Standardization Sector, Study Group 11, (Nov. 29–Dec. 17, 1993).

N/A, "Clauses 7 and 8 of Q.2931," ITU—Telecommunication Standardization Sector, Study Group 11, (Dec. 1993).

N/A, "Revised Q.2931 User Side SDL Diagrams," ITU—Telecommunication Standardization Sector, Study Group 11, (Nov. 29–Dec. 17, 1993).

N/A, "Revised Q.2931 Network Side SDL Diagrams," ITU—Telecommunication Standardization Sector, Study Group 11, (Nov. 29–Dec. 17, 1993).

N/A, "AnnexesB, C, D, F, H and I of Q.2931," ITU—Telecommunication Standardization Sector, Study Group 11, (Nov. 29–Dec. 17, 1993).

N/A, "Annex E of Recommendation Q.93B," ITU—Telecommunication Standardization Sector, Study Group 11, (Nov. 29–Dec. 17, 1993).

N/A, "Rec. Q.2931, Annex G—Status Monitoring of SPCs," ITU—Telecommunication Standardization Sector, Study Group 11, (Nov. 29–Dec. 17, 1993).

N/A, "Annex J of Q.2931," ITU—Telecommunication Standardization Sector, Study Group 11, (Dec. 1993).

N/A, "Appendix 1/Q.2931: Guidelines for the Use of Instruction Indicators," ITU—Telecommunication Standardization Sector, Study Group 11, (Nov. 29–Dec. 17, 1993).

N/A, "Draft text for Q.2931: Appendix II (Information Items Required for Connection Establishment and Routing in B–ISDN)," ITU—Telecommunication Standardization Sector, Study Group 11.

N/A, "General Recommendations on Telephone Switching and Signalling—Intelligent Network / Distributed Functional Plane for Intelligent Network CS–1," ITU–T Recommendation Q.1214.

Kumar, Sanjay, "Legacy Voice Service at a Native ATM Terminal," ATM_Forum/95–0917R1, ATM Forum Technical Committee, (Oct. 2–6, 1995).

Duault, Maurice, et al., "Baseline Text for Voice and Telephony Over ATM—ATM Trunking for Narrowband Services," ATM_Forum/95–0446R3, ATM Forum Technical Committee, (Oct. 2–6, 1995).

Choi, Don, "Requirements for ATM Trunking," ATM_Forum/95–1401, ATM Forum Technical Committee, (Oct. 2–6, 1995).

Chiang, Chin, "Proposed Changes to Proxy Signaling Capability," ATM Forum/95–0046, ATM Forum: Signaling Working Group, (Feb. 6–10, 1995).

Amin–Salehi, Bahman, "Third Party Call Setup for a Video–on Demand Connection Establishment," ATM_Forum/95–0022, ATM Forum Technical Committee, (Feb. 5–8, 1995).

Caves, Keith, "Proposed Modifications to the Baseline Text (95–0446R2) of the 'VTOA—ATM Trunking for Narrowband Services' Specification," ATM Forum/95–1134, ATM Forum Technical Committee, (Oct. 2–6, 1995).

Schink, Helmut, et al., "CES as a Flexible Trunking Method," ATM_Forum/95–1157, ATM Forum Technical Committee, (Oct. 2–6, 1995).

Duault, Maurice, "Proposal for ATM Trunking Options," ATM_Forum/95–1230, ATM Forum Technical Committee, (Oct. 2–6, 1995).

Okutani, Takenori, et al., "VTOA: Reference Configuration–ATM Trunking for Narrowband Services," ATM–Forum/95–1364, ATM Forum Technical Committee, (Oct. 2–6, 1995).

Stodola, Kevin, "Circuit Emulation Services Version 2 Baseline," ATM_Forum/95–1504, ATM Forum Technical Committee, (Dec. 11–15, 1995).

N/A, "I.751 Asynchronous Transfer Mode (ATM) Management View of the Network Element View," ITU—Telecommunication Standardization Sector, Study Group 15, (Nov. 13–24, 1995).

N/A, "Draft I.732," ITU—Telecommunication Standardization Sector, Study Group 15, (Nov. 13–24, 1995).

N/A, "Editorial Modificaitons for Draft New ITU–T Recommendation I.731," ITU—Telecommunication Standardization Sector, Study Group 15, (Nov. 13–24, 1995).

Buhrke, R.E., "Proposed Unified Functional Model," T1S1.5/95–036, Committee T1 Contribution, (Feb. 1995).

FIG. 10

| ASSOCIATED POINT CODE | CIC | VP | VC | TRUNK GROUP NUMBER | GROUP MEMBER NUMBER | HARDWARE IDENTIFIER | ECHO CANCELLER | ECHO CONTROL | SATELLITE INDICATOR | CIRCUIT STATUS | CIRCUIT STATE | TIME/ DATE |
|---|---|---|---|---|---|---|---|---|---|---|---|---|
| | | | | | | | | | | | | |
| | | | | | | | | | | | | |

FIG. 11

| TRUNK GROUP NUMBER | GLARE RESOLUTION | CONTINUITY CONTROL | CLLI | SATELLITE TRUNK GROUP | SERVICE INDICATOR | ASSOCIATED NPA | SELECTION SEQUENCE | HOP COUNTER | ACC ACTIVE | OMI | NEXT FUNCTION | INDEX |
|---|---|---|---|---|---|---|---|---|---|---|---|---|
| | | | | | | | | | | | | |
| | | | | | | | | | | | | |

FIG. 12

| EXCEPTION TABLE INDEX | CARRIER SELECTION IDENTIFICATION | CARRIER IDENTIFICATION | NATURE OF ADDRESS | CALLED PARTY | | NEXT FUNCTION | INDEX |
|---|---|---|---|---|---|---|---|
| | | | | DIGITS FROM | DIGITS TO | | |
| | | | | | | | |
| | | | | | | | |

FIG. 13

| ANI TABLE INDEX | CALLING PARTY CATEGORY | NATURE OF ADDRESS | CALLING PARTY/CHARGE NUMBER | | | ORIGINATING LINE INFORMATION | NEXT FUNCTION | NEXT INDEX |
|---|---|---|---|---|---|---|---|---|
| | | | DIGITS FROM | DIGITS TO | DATA | | | |
| | | | | | | | | |
| | | | | | | | | |

FIG. 14

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 15

| ROUTING TABLE INDEX | TRANSIT NETWORK SELECTION | | | | CIRCUIT CODE | NEXT FUNCTION #1 | INDEX #1 | NEXT FUNCTION #2 | INDEX #2 | NEXT FUNCTION #3 | INDEX #3 |
|---|---|---|---|---|---|---|---|---|---|---|---|
| | NETWORK IDENTIFICATION PLAN | DIGITS FROM | DIGITS TO | | | | | | | | |
| | | | | | | | | | | | |
| | | | | | | | | | | | |

FIG. 16

| INDEX | MESSAGE RECEIVED CAUSE VALUE | GENERAL LOCATION | CODING STANDARD | CAUSE VALUE | NEXT FUNCTION | INDEX |
|---|---|---|---|---|---|---|
| | | | | | | |
| | | | | | | |

| MESSAGE TYPE | PARAMETERS | INDEX #1 | INDEX #... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | OPTIONAL BACKWARD CALL INDICATORS | | | |
| | OPTIONAL "FE" INDICATOR | | | |
| ANSWER | ACCESS TRANSPORT | | | |
| | BACKWARD CALL INDICATOR | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

*FIG. 17*

SYSTEM AND METHOD FOR CONNECTING A CALL

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of telecommunications call switching and transport.

BACKGROUND OF THE INVENTION

Broadband systems are being developed and implemented. Broadband systems provide telecommunications providers with many benefits, including greater bandwidth, more efficient use of bandwidth, and the ability to integrate voice, data, and video communications. These broadband systems provide callers with increased capabilities at lower costs.

Switches and other communication devices use broadband systems, such as a synchronous optical network (SONET) ring or a synchronous digital hierarchy (SDH) system, to connect calls to other switches and communication devices. The switches, for example, determine how a call is to be connected and control the switching over the broadband system. In addition, switches, such as tandem switches, are used to concentrate telecommunication traffic between networks, switches, and other communication devices.

However, controlling call switching and connection functions from switches and some other communication devices is expensive. Moreover, intelligent network routing and processing functions are limited. In addition, conventional switching systems do not provide highly efficient call concentration and call routing in networks such as metropolitan area networks (MANs). Therefore, there is a need for a system that more efficiently and more easily provides connections for switches and other communications devices over broadband networks, such as the SONET ring or the SDH system. An effective system is needed that can control switching and call connections between system devices on a call-by-call basis in an asynchronous transfer mode (ATM) environment.

SUMMARY OF THE INVENTION

The present invention comprises a broadband system for connecting calls that use time division multiplexing. The system comprises a SONET ring that is adapted to interconnect devices coupled to the SONET ring. The SONET ring comprises SONET multiplexers coupled by SONET paths. The SONET multiplexers are adapted to add calls to, and drop calls from, the SONET ring. The system further comprises an ATM cross connect system that is coupled to the SONET ring. The ATM cross connect system comprises ATM cross connect devices. The ATM cross connect devices are adapted to provide provisioned ATM connections over the SONET ring. The system further comprises a plurality of ATM interworking units that are coupled to the ATM cross connect system. The ATM interworking units are adapted to interwork calls with selected ATM connections in response to control messages. The selected ATM connections are provisioned between selected ATM interworking units by the ATM cross connect system over the SONET ring. The system also comprises a signaling processor system that is adapted to receive call signaling for the calls, to process the call signaling to select the ATM connections for the calls, and to send the control messages to the selected ATM interworking units. The control messages designate the selected ATM connections.

The present invention also comprises a broadband system for connecting a call having a time division multiplex format. The system comprises a SONET ring that is adapted to interconnect devices coupled to the SONET ring. The SONET ring comprises a plurality of SONET multiplexers that are coupled by a SONET path. The SONET multiplexers are adapted to add the call to, and drop the call from, the SONET ring. The system further comprises an ATM cross connect system comprising a plurality of ATM cross connect devices coupled to the SONET multiplexers. The ATM cross connect devices are adapted to provide a provisioned ATM connection through the SONET multiplexers over the SONET path. Still further, the system comprises a plurality of ATM interworking units coupled to the ATM cross connect devices. The ATM interworking units are adapted to interwork the call with the provisioned ATM connection in response to control messages. The provisioned ATM connection is provisioned by the ATM cross connects between the ATM interworking units through the SONET multiplexers over the SONET ring. The system also comprises a signaling processor system that is adapted to receive call signaling for the call, to process the call signaling to select the ATM connection for the call, and to send the control messages to the ATM interworking units. The control messages designate the selected ATM connection.

The present invention also is directed to a broadband system for connecting a call over a SONET ring that is adapted to interconnect devices coupled to the SONET ring. The call has a time division multiplex format and has user communications and call signaling. The system comprises a SONET multiplexer that is coupled to the SONET ring. The SONET multiplexer is adapted to add the call to the SONET ring. The system also comprises an ATM cross connect that is coupled to the SONET multiplexer. The ATM cross connect is adapted to provide a provisioned ATM connection through the SONET multiplexer over the SONET ring. The system also comprises an ATM interworking unit coupled to the ATM cross connect. The ATM interworking unit is adapted to interwork the user communications with the ATM connection in response to a control message. The ATM connection is provisioned by the ATM cross connect from the ATM interworking unit through the SONET multiplexer over the SONET ring. The system further comprises a signaling processor that is adapted to process the call signaling to select the ATM connection for the call from among a plurality of connections and to send the control message to the ATM interworking unit designating the ATM connection.

Still further, the present invention is directed to a broadband system for connecting a call over a SONET ring that is adapted to interconnect devices coupled to the SONET ring. The call has call signaling and user communications. The system comprises a signaling processor that is adapted to receive the call signaling for the call, to process the call signaling to select an ATM connection for the call, and to send a control message designating the selected ATM connection. The system also comprises an ATM interworking unit that is adapted to receive the control message from the signaling processor, to receive the user communications, and to interwork the use communications for the call between a non-ATM connection and the selected ATM connection in response to the control message. The system includes a SONET multiplexer that is adapted to provide access to the SONET ring for the selected ATM connection. The system also includes an ATM cross connect that is adapted to provision the selected ATM connection from the ATM interworking unit through the SONET multiplexer over the SONET ring. The call is transported over the provisioned selected ATM connection from the ATM interworking unit, though the ATM cross connect, through the SONET multiplexer, and over the SONET ring.

Further still, the present invention is directed to a broadband system for connecting a call having a time division multiplex format over a broadband ring. The call has call signaling and user communications. The system comprises a signaling processor that is adapted to receive the call signaling for the call, to process the call signaling to select a selected connection for the call from among a plurality of connections, and to send the control message designating the selected connection. The system comprises an add/drop multiplexer that is adapted to provide the call access to the broadband ring. The system also comprises a cross connect that is adapted to provision the selected connection through the add/drop multiplexer over the broadband ring. The system further comprises an interworking unit that is adapted to receive the user communications and to receive the control message from the signaling processor and, in response thereto, to interwork the user communications for the call to asynchronous transfer mode cells that identify the selected connection. The interworking unit maps the asynchronous transfer mode cells to broadband frames and transports the broadband frames over the selected connection. The connection is provisioned by the cross connect from the interworking unit through the add/drop multiplexer over the broadband ring.

The present invention is further directed to a method for connecting a call that uses time division multiplexing. The method comprises provisioning an ATM connection over a SONET ring. The method further comprises receiving and processing call signaling to select the ATM connection for the call from among a plurality of connections. A control message is transported designating the selected ATM connection for the call. The control message is received and, in response thereto, the call is interworked to the selected ATM connection. The call is transported on the selected ATM connection over the SONET ring.

The present invention is further directed to a method for connecting a call that uses time division multiplexing. The method comprises provisioning an ATM connection over a SONET ring between a first ATM interworking unit and a second ATM interworking unit. The method comprises receiving and processing call signaling in a signaling processor to select the ATM connection for the call from among a plurality of connections. A control message is transported from the signaling processor designating the selected ATM connection for the call. The control message is received in the first ATM interworking unit and, in response thereto, the call is interworked from a first non-ATM connection with the selected ATM connection. The call is transported on the selected ATM connection over the SONET ring to the second ATM interworking unit. The call is interworked in the second interworking unit from the selected ATM connection to a second non-ATM connection.

In addition, the present invention is directed to a system for connecting a call in a broadband ring. The call has user communications and call signaling. The user communications are interworked to asynchronous transfer mode cells and then mapped to broadband frames. The system transports the broadband frames on a selected connection over the broadband ring. The selected connection is a virtual connection. The system comprises a signaling processor that is adapted to receive the call signaling, to process the call signaling to select a second connection, and to transport a control message that designates the selected second connection. Included is an add/drop multiplexer that is adapted to drop the broadband frames for the call from the broadband ring. A cross connect also is included. The cross connect is adapted to provide the provisioned selected connection from the broadband ring through the add/drop multiplexer. The system further includes an interworking unit that is adapted to receive the broadband frames for the call from the selected connection through the add/drop multiplexer and through the cross connect. The interworking unit receives the control message from the signaling processor, converts the broadband frames to user communications having a communication format, and transports the user communications over the selected second connection.

In another aspect, the present invention is a system for connecting a call in a broadband system. The call has user communications and call signaling. The system comprises a first communication device that is adapted to transport the call and a second communication device that is adapted to receive the call. The system comprises a signaling processor that is adapted to receive the call signaling, to process the call signaling to select a first connection and a second connection, to transport a first control message that designates the selected first connection, and to transport a second control message that designates the selected second connection. The first selected connection comprises a virtual path over a broadband path. The virtual path is provisioned over the broadband path in the broadband system. The selected second connection connects to the second communication device. The system further comprises a first interworking unit that is adapted to receive the user communications in a communication format, to receive the first control message from the signaling processor, to convert the user communications to asynchronous transfer mode cells that identify the selected first connection that was designated in the first control message, and to transport the asynchronous transfer mode cells. Also comprising the system is a first cross connect that is adapted to receive the asynchronous transfer mode cells from the first interworking unit and to cross connect the asynchronous transfer mode cells to the virtual path for the selected first connection. A first add/drop multiplexer is included to receive the asynchronous transfer mode cells from the first cross connect and to add the asynchronous transfer mode cells to the broadband path for the selected first connection.

The system further comprises a second add/drop multiplexer that is adapted to receive the asynchronous transfer mode cells on the broadband path and to drop the asynchronous transfer mode cells from the broadband path. A second cross connect is in the system to receive the asynchronous transfer mode cells from the second add/drop multiplexer and to cross connect the asynchronous transfer mode cells according to the provisioned virtual path. The system includes a second interworking unit that is adapted to receive the asynchronous transfer mode cells from the second cross connect and to receive the second control message from the signaling processor. The second interworking unit converts the asynchronous transfer mode cells to user communications having a communication format and transports the user communications to the second communication device over the selected second connection.

In still another aspect, the present invention is directed to a system for connecting a call in a broadband system. The call has user communications and call signaling. The system comprises a signaling processor and a broadband interface. The signaling processor is adapted to receive the call signaling and to process the call signaling to select a connection. The signaling processor transports a control message that designates the selected connection. The selected connection comprises a virtual path over a broadband ring in the broadband system. The virtual path is provisioned over the broadband ring. The broadband interface is adapted to receive the user communications in a communication format and to receive the control message from the signaling processor. The broadband interface interworks the user communications to asynchronous transfer mode cells that identify the selected connection and maps the asynchronous transfer mode cells to broadband frames. The broadband interface transports the broadband frames on the provisioned virtual path over the broadband ring.

BRIEF DESCRIPTION OF THE DRAWINGS

FIG. 10 is a table diagram of a trunk circuit table used in the signaling processor of FIG. 8.

FIG. 11 is a table diagram of a trunk group table used in the signaling processor of FIG. 8.

FIG. 12 is a table diagram of an exception circuit table used in the signaling processor of FIG. 8.

FIG. 13 is a table diagram of an automated number index table used in the signaling processor of FIG. 8.

FIG. 14 is a table diagram of a called number table used in the signaling processor of FIG. 8.

FIG. 15 is a table diagram of a routing table used in the signaling processor of FIG. 8.

FIG. 16 is a table diagram of a treatment table used in the signaling processor of FIG. 8.

FIG. 17 is a table diagram of a message table used in the signaling processor of FIG. 8.

DETAILED DESCRIPTION

Figure 1:
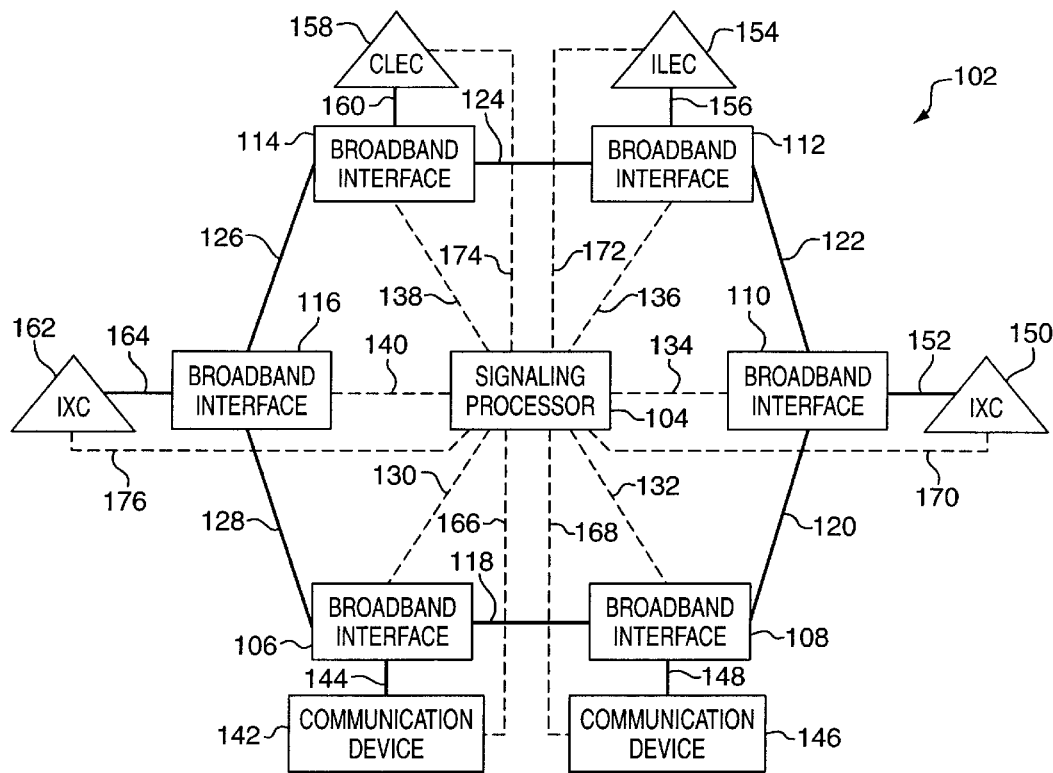
FIG. 1 is a block diagram of a broadband metropolitan area network with a plurality of broadband interfaces of the present invention.

Telecommunication systems have a number of communication devices in local exchange and interexchange environments that interact to provide call services to customers. Both traditional services and resources and intelligent network (IN) services and resources are used to process, route, or connect a call to a designated connection.

A call has call signaling and user communications. The user communications contain the caller's information, such as a voice communication or data communication, and they are communicated over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.933.

A call can be transported to or from a communication device. A communication device can be, for example, customer premises equipment (CPE), a service platform, a switch, or any other device capable of initiating, handling, or terminating a call. Customer premises equipment can be, for example, a telephone, a computer, a facsimile machine, or a private branch exchange. A service platform can be, for example, a service platform or any other enhanced platform that is capable of processing calls.

Communications devices in both traditional and intelligent systems can use a variety of protocols and methods to achieve a connection for a call or to complete call processing. For example, CPE can be connected to a switch using a time division multiplex (TDM) format, such as super frame (SF) or extended superframe (ESF). The ESF connection allows multiple devices at the customer site to access the local switch and obtain telecommunication services.

Also, communication devices, such as telephones, are likely connected to a remote digital terminal, and the connection typically carries analog signals over twisted pair wires. The remote digital terminals provide a digital interface between the telephones and a local switch by converting the analog signals from the telephones into a multiplexed digital signal to be transferred to the local switch. A common standard for the connection between the remote digital terminal and the local switch is provided in Bellcore Reference GR-TSY-000303 (GR-303).

In addition, communications devices use broadband protocols, such as broadband-integrated services digital network (B-ISDN). Broadband systems provide greater bandwidth than narrowband systems for calls, in addition to providing digital processing of the calls. B-ISDN provides a communication device with a digital connection to a local switch or other device. The B-ISDN loop provides more bandwidth and control than a convention local loop. The European implementation of B-ISDN and other broadband protocols can also be used.

Communication devices can use circuit-based connections for calls. For example, digital signal (DS) level communications, such as digital signal level 3 (DS3), digital signal level one (DS1), and digital signal level zero (DS0) are conventional circuit-based connections. European level four (E4), European level three (E3), European level one (E1), European level zero (E0), and other European equivalent circuit-based connections also are used.

High speed electrical/optical transmission protocols also are used by communications devices for switching and signaling. The synchronous optical network (SONET) protocol, which is used primarily in North America, and the synchronous digital hierarchy (SDH) protocol, which is used primarily in Europe, are examples of high speed electrical/optical protocols. The SONET and SDH protocols describe the physical media and transmission protocols through which the communications take place.

The SONET and SDH protocols define a broadband frame structure for SONET and SDH communication signals. Multiple frames travel in the communication signals. Each frame consists of overhead and payload. The overhead containes operations, administration, maintenance, and provisioning infromation, such as framing information, error correction information, and pointer information. The payload contains the user communications information that is carried in the frame by the communication signal. The payload is comprised of payload components that are mapped into the frames. For example, user communications from a DS1, an E1, or an asynchronous transfer mode (ATM) connection may be mapped into the broadband frames. Thus, in a SONET system, the user communications are mapped to SONET frames. In an SDH system, user communications are mapped to SDH frames.

SONET includes optical transmission of optical carrier (OC) signals and electrical transmission of synchronous transport signals (STSs). SONET signals transmit at a base rate of 51.84 Mega-bits per second (Mbps) for optical carrier level one (OC-1) and synchronous transport signal level one (STS-1). Also transmitted are multiples thereof, such as an STS level three (STS-3) and an OC level three (OC-3) at rates of 155.52 Mbps, an STS level twelve (STS-12) and an OC level twelve (OC-12) at rates of 622.08 Mbps, an STS level forty-eight (STS-48) and an OC level forty-eight (OC-48) at rates of 2,488.32 Mbps, and fractions thereof, such as a virtual tributary group (VTG) at a rate of 6.912 Mbps.

SDH includes transmission of optical synchronous transport module (STM O) signals and electrical synchronous transport module (STM E) signals. SDH signals transmit at a base rate of 155.52 Mbps for synchronous transport module level one electrical and optical (STM-1 E/O). Also transmitted are multiples thereof, such as an STM level four electrical/optical (STM-4 E/O) at rates of 622.08 Mbps, an STM level sixteen electrical/optical (STM-16 E/O) at rates of 2,488.32 Mbps, and fractions thereof, such as a tributary unit group (TUG) at a rate of 6.912 Mbps.

ATM is one technology that is being used in conjunction with SONET and SDH to provide broadband call switching and call transport for telecommunication services. ATM is a protocol that describes communication of user communications in ATM cells. Because cells are used in the protocol, calls can be transported on demand for connection-oriented traffic or connectionless-oriented traffic, constant-bit traffic or variable-bit traffic, and between equipment that either requires timing or does not require timing.

Some ATM systems handle calls over switched virtual paths (SVPs) and switched virtual circuits (SVCs). The virtual nature of ATM allows multiple communication devices to use a physical communication line at different times. This type of virtual connection more efficiently uses bandwidth, and thereby provides more cost efficient transport for customer calls, than permanent virtual circuits (PVCs) or other dedicated circuits.

The ATM system is able to connect a caller from an origination point to a destination point by selecting a connection from the origination point to the destination point. The connection contains a virtual path (VP) and a virtual channel (VC). A VC is a logical connection between two end points for the transfer of ATM cells. A VP is a logical combination of VCs. The ATM system designates the selected connection by specifying a virtual path identifier (VPI) that identifies the selected VP and a virtual channel identifier (VCI) that identifies the selected VC within the selected VP. Because many ATM connections are uni-directional, bi-directional communications in an ATM system usually require companion VPIs/VCIs.

An ATM system may be configured to transmit ATM cells over a SONET broadband system or an SDH broadband system. The ATM cells are mapped into the payload of the SONET frames or the SDH frames and transported over a broadband path, such as a SONET pipe or an SDH pipe. Typically the SONET and SDH systems are configured in a ring topology that can provide redundant and alternate transmission paths for calls.

The present invention efficiently and easily provides connections and switching for switches and other communication devices over a broadband system. The present invention provides call connections by using ATM over a SONET broadband system or an SDH broadband system. The ATM system provides robust switching functions at an affordable cost.

FIG. 1 illustrates the broadband system 102 of the present invention. The broadband system 102 concentrates and switches telecommunication call traffic between networks, switches, and elements of the broadband system. The broadband system 102 allows switches and other communication devices to connect to each other without a direct connection between each switch and communication device. The broadband system 102 may be, for example, a broadband metropolitan area network (BMAN).

The broadband system 102 comprises a signaling processor 104 and a plurality of broadband interfaces, such as a first broadband interface 106, a second broadband interface 108, a third broadband interface 110, a fourth broadband interface 112, a fifth broadband interface 114, and a sixth broadband interface 116. It will be appreciated that the broadband system 102 may have a greater or a fewer number of broadband interfaces.

The broadband interfaces 106, 108, 110, 112, 114, and 116 are connected through a series of connections. Thus, the first broadband interface 106 is connected to the second broadband interface 108 through a connection 118. The second broadband interface 108 is connected to the third broadband interface 110 through a connection 120. The third broadband interface 110 is connected to the fourth broadband interface 112 through a connection 122. The fourth broadband interface 112 is connected to the fifth broadband interface 114 through a connection 124. The fifth broadband interface 114 is connected to the sixth broadband interface 116 through a connection 126. The sixth broadband interface 116 is connected to the first broadband interface 106 through a connection 128. The broadband interfaces 106, 108, 110, 112, 114, and 116 and the connections 118, 129, 122, 124, 126, and 128 form a broadband ring. Each of the broadband interfaces 106, 108, 110, 112, 114, and 116 is linked to the signaling processor 104 through a link 130, 132, 134, 136, 138, and 140, respectively.

Any broadband interface may reach any other broadband interface in the broadband ring. For example, the first broadband interface 106 may connect to the fifth broadband interface 114 by connecting through the connection 128, the sixth broadband interface 116, and the connection 126.

Typically, the connections 118, 120, 122, 124, 126, and 128 are ATM VPIs/VCIs connections that are provisioned over SONET or SDH broadband paths. For example, the connections 118, 120, 122, 124, 126, and 128 may be VPIs/VCIs that are provisioned over OC-48 pipes. The broadband interfaces 106, 108, 110, 112, 114, and 116 and the SONET or SDH broadband paths containing the provisioned virtual connections 118, 120, 122, 124, 126, and 128 form a SONET ring or an SDH ring.

Each of the broadband interfaces 106, 108, 110, 112, 114, and 116 may be connected to a switch or to another communication device. In the broadband system 102 of the present invention, the first broadband interface 108 is connected to a first communication device 142 through a connection 144. The second broadband interface 108 is connected to a second communication device 146 through a connection 148. The third broadband interface 110 is connected to a first interexchange carrier (IXC) 150 through a connection 152. The fourth broadband interface 112 is connected to an incumbent local exchange carrier (ILEC) 154 through a connection 156. The fifth broadband interface 114 is connected to a competitive local exchange carrier (CLEC) 158 through a connection 160. The sixth broadband interface 116 is connected to a second IXC 162 through a connection 164. The signaling processor 104 is linked to the first communication device 142 through a link 166, to the second communication device 144 through a link 168, to the first IXC 150 through a link 170, to the ILEC 154 through a link 172, to the CLEC 158 through a link 174, and to the second IXC 162 through a link 176.

The connections 144, 148, 156, and 160 may be any connection that carries circuit-based traffic. Typically, these are time division multiplex (TDM) connections, such as DS3 or DS1 connections. Typically, the common DS0 used for traditional voice calls is embedded within the DS3 or DS1. The connections 152 and 164 may be either TDM connections, such as DS3 or DS1 connections, or broadband path connections, such as OC-48 connections that carry ATM traffic.

Connections are used to transport user communications and other device information between communication devices and between the elements and devices of the broadband system 102. The term "connection" as used herein means the transmission media used to carry user communications between the elements of the broadband system 102 or between the broadband system 102 and other communication devices and elements. For example, a connection could carry a user's voice, computer data, or other communication device data. A connection can be associated with either in-band communications or out-of-band communications.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as SS7, C7, ISDN, B-ISDN, GR-303, local area network (LAN), or data bus call signaling. A link can be, for example, an AAL5 data link, UDP/IP, ethernet, or DS0 over T1. In addition, a link, as shown in the figures, can represent a single physical link or multiple links, such as one link or a combination of links of ISDN, SS7, TCP/IP, or some other data link. The term "control message" as used herein means a control or signaling message, a control or signaling instruction, or a control or signaling signal, whether proprietary or standardized, that conveys information from one point to another.

Those skilled in the art are aware that large networks have many more components than those that are shown in FIG. 1. For example, there may typically be a multitude of switches and communication devices connected through the broadband system 102. Those skilled in the art will appreciate that a signal transfer point (STP) may be used to transfer signaling among the various components. The number of components shown on FIG. 1 has been restricted for clarity. The invention is fully applicable to a large network or a small network.

The signaling processor 104 is a signaling platform that can receive and process signaling. Based on the processed signaling, the signaling processor 104 selects processing options, connections, or resources for the user communications and generates and transmits control messages that identify the communication device, processing option, service, or resource that is to be used. The signaling processor 104 also selects virtual connections and circuit-based connections for call routing and generates and transports control messages that identify the selected connections. The signaling processor 104 can process various forms of signaling, including ISDN, SS7, and C7. A preferred signaling processor is discussed in detail below.

The broadband interfaces 106, 108, 110, 112, 114, and 116 transport telecommunication traffic between circuit-based connections and virtual connections, between circuit-based connections and other circuit-based connections, or between virtual connections and other virtual connections. The broadband interfaces 106, 108, 110, 112, 114, and 116 place telecommunication traffic onto the broadband paths of the broadband system 102 and take telecommunication traffic from the broadband paths of the broadband system. Likewise, the broadband interfaces 106, 108, 110, 112, 114, and 116 receive telecommunication traffic from circuit-based systems and transfer telecommunication traffic to circuit-based systems.

The broadband interfaces 106, 108, 110, 112, 114, and 116 provide switching and intelligent network functions for calls. For example, the broadband interfaces 106, 108, 110, 112, 114, and 116, together with the signaling processor 104, connect calls from one communication device to another communication device.

The communication devices 142 and 146 each comprise CPE, a service platform, a switch, a remote digital terminal, or any other device capable of initiating, handling, or terminating a call. CPE can be, for example, a telephone, a computer, a facsimile machine, or a private branch exchange. A service platform can be, for example, a service platform or any other enhanced platform that is capable of processing calls. A remote digital terminal is a device that concentrates analog twisted pairs from telephones and other like devices and converts the analog signals to a digital format known as GR-303.

The first and second IXCs 150 and 162 comprise communication devices that can transport, receive, and handle calls. The first and second IXCs 150 and 162 may be connected to other IXCs, local exchange carriers (LECs), or other communication devices.

The ILEC 154 and the CLEC 158 each comprise switches that transport, receive, and handle calls. The ILEC 154 is an established local network. The CLEC 158 is a newer local network that is allowed to compete with the established local network. The ILEC 154 and the CLEC 158 may be, for example, class 4 tandem switches, class 5 switches, or class 4/5 switches. The switches shown on FIG. 1 are well known circuit switches with examples being the Nortel DMS-250 or the Lucent 5ESS.

The system of FIG. 1 operates as follows for a call that is transported between the CLEC 158 and the ILEC 154 through a SONET ring. The CLEC 158 transports call signaling to the signaling processor 104 over the link 174 and transports user communications in a TDM format to the fifth broadband interface 114 over the connection 160.

The signaling processor 104 receives the call signaling and processes the call signaling to determine connections for the call. The signaling processor 104 selects a first connection 124 and a second connection 156. The selected first connection 124 is a SONET/ATM connection having an ATM VPI/VCI virtual connection that is provisioned over a SONET OC level broadband path on the SONET ring between the fourth broadband interface 112 and the fifth broadband interface 114. For example, the selected first connection may be a VPI/VCI provisioned over an OC-48 span. The selected second connection 156 is a TDM connection. The signaling processor 104 transports a control message over the link 138 to the fifth broadband interface 114 identifying the selected first connection 124. The signaling processor 104 also transmits a control message over the link 136 to the fourth broadband interface 112 identifying the selected second connection 156.

The fifth broadband interface 114 receives the control message from the signaling processor 104 and the user communications from the CLEC 158. The fifth broadband interface 114 converts the TDM formatted user communications to ATM cells that identify the selected first connection 124 and maps the ATM cells to SONET frames. The fifth broadband interface 114 places the SONET frames on the virtual connection of the designated SONET path for the selected first connection 124 so that they are transported to the fourth broadband interface 112 over the SONET ring.

The fourth broadband interface 112 receives the control message from the signaling processor 104 and receives the SONET frames over the selected first connection 124. The fourth broadband interface 112 drops the SONET frames from the SONET ring and then maps the SONET frames to the ATM cells. The fourth broadband interface 112 converts the ATM cells to TDM formatted user communications and transports the user communications to the ILEC 154 over the selected second connection 156.

It will be appreciated that a call may be connected from the ILEC 154 and to the CLEC 158 in the same manner. Alternatively, a call may be connected between the ILEC 154 and the first IXC 105, the ILEC 154 and the second communication device 146, or the ILEC 154 and the first communication device 142. In fact, a call may be connected between any of the elements in the broadband system 102.

Figure 2:
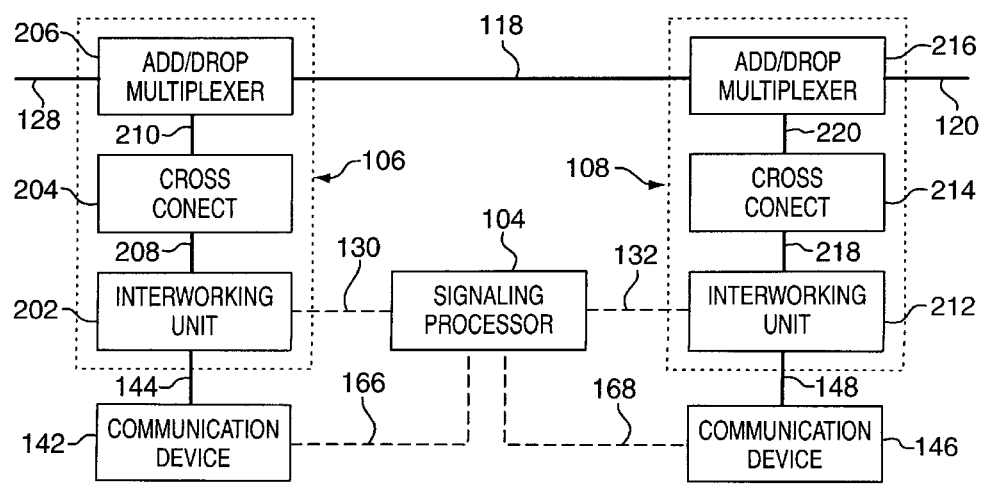
FIG. 2 is a block diagram of components of a first broadband interface and components of a second broadband interface.

FIG. 2 illustrates the components of the first broadband interface 106 and the second broadband interface 108. The first broadband interface 106 and the second broadband interface 108 are representative of broadband interfaces in the broadband system 102.

The first broadband interface 106 is comprised of a first interworking unit 202, a first cross connect 204, and a first ring terminal, such as a first add/drop multiplexer (ADM) 206. The first cross connect 204 is connected to the first interworking unit 202 through a connection 208 and to the first ADM 206 through a connection 210.

The first interworking unit 202 interworks traffic between various protocols. Preferably, the first interworking unit 202 interworks between ATM traffic and non-ATM traffic. The first interworking unit 202 operates in accordance with control messages received from the signaling processor 104 over the link 130. These control messages are typically provided on a call-by-call basis and typically identify an assignment between a DS0 and a VPI/VCI for which user communications are interworked.

Thus, the first interworking unit 202 converts TDM formatted user communications to ATM cells that identify virtual connections selected by the signaling processor 104. The first interworking unit 202 maps ATM cells to broadband frames, such as SONET frames. In addition, the first interworking unit 202 also maps broadband frames, such as SONET frames, to ATM cells. The first interworking unit 202 converts the ATM cells to TDM formatted user communications. In some instances, the first interworking unit 202 may transport control messages which may include data to the signaling processor 104.

In some embodiments, the first interworking unit 202 is operational to implement digital signal processing as instructed in the control messages. An example of digital signal processing is echo cancellation or continuity testing. A preferred embodiment of the first interworking unit 202 is discussed in detail below.

The first cross connect 204 is any device, such as an ATM cross connect, that provisions virtual connections over broadband paths, such as ATM connections over SONET paths in a SONET ring. The first cross connect 204 provides a plurality of ATM virtual connections between the first ADM 206 and the first interworking unit 202. In ATM, virtual connections are designated by the VPI/VCI in the cell header. The first cross connect 204 is configured to accept ATM cells from, and transport ATM cells to, the first interworking unit 202 and to provide a plurality of VPI/VCI connections to the first ADM 206.

The VCIs are used to differentiate individual calls on the VPI between the first cross connect 204 and the first ADM 206 and to identify the destination or handling point of the call. For example, VPI/VCI "A" may be provisioned from the first interworking unit 202, through the first cross connect 204, through the first ADM 206, and "destined" for an interworking unit connected to a cross connect in the second broadband interface 108 that is associated with the second communication device 146. VPI/VCI "B" may be provisioned from the first interworking unit 202, through the first cross connect 204, through the first ADM 206, and "destined" for an interworking unit connected to a cross connect in the fourth broadband interface 112 that is associated with the ILEC 154. (See FIG. 1.) An example of an ATM cross connect is the NEC Model 20.

The first cross connect 204 provisions the connections from the first interworking unit 202, through the first ADM 206, and to another cross connect and from another cross connect, through the first ADM, and to the first interworking unit. In a SONET system, the first cross connect 204 receives SONET frames containing mapped ATM cells from the first ADM 206 and cross connects the SONET frames on the connection to the first interworking unit 202. In addition, in a SONET system, the first cross connect 204 receives SONET frames containing mapped ATM cells from the first interworking unit 202 and cross connects the SONET frames on the designated VPI/VCI virtual connection to the first ADM 206.

The first ADM 206 adds traffic to the broadband paths of the broadband ring for the connections 118 and 128 or drops traffic from the broadband paths for the connections. The first ADM 206 may add or drop traffic that is transported at levels extending from the DS1 level to the OC level or the STS level and to equivalent standards. The broadband paths for connections leading to and from the first ADM 206, such as the connections 118 and 128, are provisioned by the first ADM 206 as, for example, SONET paths to all other communication devices in the broadband system 102. Thus, for example, a SONET path is provisioned between the first ADM 206 in the first broadband interface 106 and an ADM in the second broadband interface 108 to carry traffic for the virtual connection for the connection 118. Another SONET path is provisioned between the first ADM 206 in the first broadband interface 106 and an ADM in the sixth broadband interface 116 to carry traffic for the virtual connection for the connection 128. (See FIG. 1.)

Referring still to FIG. 2, the second broadband interface 108 is comprised of a second interworking unit 212, a second cross connect 214, and a second ring terminal, such as a second add/drop multiplexer (ADM) 216. The second cross connect 214 is connected to the second interworking unit 212 through a connection 218 and to the second ADM 206 through a connection 220.

The second interworking unit 212 interworks traffic between various protocols. Preferably, the second interworking unit 212 interworks between ATM traffic and non-ATM traffic. The second interworking unit 212 operates in accordance with control messages received from the signaling processor 104 over the link 132. These control messages are typically provided on a call-by-call basis and typically identify an assignment between a DS0 and a VPI/VCI for which user communications are interworked.

Thus, the second interworking unit 212 converts TDM formatted user communications to ATM cells that identify virtual connections selected by the signaling processor 104. The second interworking unit 212 maps ATM cells to broadband frames, such as SONET frames. In addition, the second interworking unit 212 also maps broadband frames, such as SONET frames, to ATM cells. The second interworking unit 212 converts ATM cells to TDM formatted user communications. In some instances, the second interworking unit 212 may transport control messages which may include data to the signaling processor 104.

In some embodiments, the second interworking unit 212 is operational to implement digital signal processing as instructed in the control messages. An example of digital signal processing is echo cancellation or continuity testing. A preferred embodiment of the second interworking unit 212 is discussed in detail below.

The second cross connect 214 is any device, such as an ATM cross connect, that provisions virtual connections over broadband paths, such as ATM connections over a SONET ring. The second cross connect 214 provides a plurality of ATM virtual connections between the second ADM 216 and the second interworking unit 212. In ATM, virtual connections are designated by the VPI/VCI in the cell header. The second cross connect 214 is configured to accept ATM cells from, and transport ATM cells to, the second interworking unit 212 and to provide a plurality of VPI/VCI connections to the second ADM 216.

The VCIs are used to differentiate individual calls on the VPI between the second ADM 216 and the second interworking unit 212 and to identify the destination or handling point of the call. For example, VPI/VCI "A" may be provisioned from the second interworking unit 212, through the second cross connect 214, through the second ADM 216, and "destined" for an interworking unit connected to a cross connect in the first broadband interface 106 that is associated with the first communication device 142. VPI/VCI "B" may be provisioned from the second interworking unit 212, through the second cross connect 214, through the second ADM 216, and "destined" for an interworking unit connected to a cross connect in the fourth broadband interface 112 that is associated with the ILEC 154. (See FIG. 1.) An example of an ATM cross connect is the NEC Model 20.

The second cross connect 214 provisions the virtual connections from the second interworking unit 212, through the second ADM 216, and to other cross connects and from other cross connects, through the the ADM, and to the second interworking unit. In a SONET system, the second cross connect 214 receives SONET frames containing mapped ATM cells from the second ADM 216 and cross connects the SONET frames on the connection to the second interworking unit 212. In addition, in a SONET system, the second cross connect 214 receives SONET frames containing mapped ATM cells from the second interworking unit 212 and cross connects the SONET frames on the designated virtual connection for the connection to the second ADM 216.

The second ADM 216 adds traffic to the broadband paths of the broadband ring for the connections 118 and 120 or drops traffic from the broadband paths for the connections. The second ADM 216 may add or drop traffic that is transported at levels extending from the DS1 level to the OC level or the STS level and equivalent standards. The broadband paths for connections leading to and from the second ADM 216, such as the connections 118 and 120, are provisioned by the second ADM 216 as, for example, SONET paths to all other communication devices in the broadband system 102. Thus, for example, a SONET path is provisioned between the second ADM 216 in the second broadband interface 108 and the first ADM 206 in the first broadband interface 106 to carry traffic for the virtual connection for the connection 118. Another SONET path is provisioned between the second ADM 216 in the second broadband interface 108 and an ADM in the sixth broadband interface 116 to carry traffic for the virtual connection for the connection 120. (See FIG. 1.)

A broadband path in a SONET system is identified by a SONET OC level or STS level path. Similarly, a virtual connection is identified by an ATM VPI/VCI or companion ATM VPIs/VCIs. This combination of the provisioned virtual connection in the provisioned broadband path shall be referred to herein as the ATM connection over the SONET path or as the virtual connection of the broadband path. Thus, for example, the provisioned VPI/VCI between the first interworking unit 202 and the second interworking unit 212, through the first cross connect 204 and the second cross connect 214, which extends through the provisioned broadband path of the SONET ring between the first ADM 206 and the second ADM 216 is referred to herein as the virtual connection over the broadband path for the connection 118 or as the ATM connection of the SONET ring for the connection 118.

It will be appreciated that the system described above may be modified to incorporate various other carrier network and system equipment. For example, in some cases, a terminal multiplexer or an access multiplexer may be used instead of the add/drop multiplexer of the preferred system described above.

The first broadband interface 106 and the second broadband interface 108 of FIG. 2 operate as follows when the first communication device 142 transports a call to the second communication device 146 in a SONET broadband system 102. The operation of the first broadband interface 106 and the second broadband interface 108 are representative of the other broadband interfaces 110, 112, 114, and 116.

Referring to FIG. 1, it will be understood that SONET paths are provisioned from each broadband interface 106, 108, 110, 112, 114, and 116 to every other broadband interface in the broadband network 102. For example, the fifth broadband interface 114 will have a SONET path provisioned to every other broadband interface 106, 108, 110, 112, and 116. It will be appreciated that this forms a flat architecture between the broadband interfaces 106, 108, 110, 112, 114, and 116 which is implemented over the SONET ring.

Referring to FIG. 1 and FIG. 2, the SONET paths are provisioned between the ADMs in each broadband interface 106, 108, 110, 112, 114, and 116, such as between the first ADM 206 and the second ADM 216. In a similar fashion, ATM connections are provisioned between the cross connects of each broadband interface 106, 108, 110, 112, 114, and 116 to the cross connects in each other broadband interface and to the associated interworking units. For example, the first cross connect 204 in the first broadband interface 106 uses the SONET paths provided by the ADM 206 to provision an ATM connection from the first interworking unit 202 through the second cross connect 214 in the second broadband interface 108 to the second interworking unit 212.

The interworking units of each of the broadband interfaces 106, 108, 110, 112, 114, and 116 have a provisioned ATM connection over the SONET ring to each of the interworking units in the other broadband interfaces. Thus, it can be seen that the first interworking unit 202 in the first broadband interface 106 has a provisioned ATM connection over the SONET ring to each of the interworking units in the other broadband interfaces 108, 110, 112, 114, and 116. For example, the first interworking unit 202 in the first broadband interface 106 has a provisioned ATM connection over the SONET ring to the second interworking unit 212 in the second broadband interface 108. Because the ATM connections are provisioned over the SONET ring, when the signaling processor 104 selects a connection, an interworking unit places the ATM cells on the selected connection, and the ATM cells are transported in the broadband frames to the receiving interworking unit. It will be appreciated that ATM connections may be provisioned over the SONET ring prior to a call, and that ATM connections may be reprovisioned over the SONET ring during or after a call.

When a call is transported, it must conform to both the ATM protocol and the SONET protocol. The user communications are first placed into ATM cells that identify the VPI/VCI of the selected connection. This allows ATM capable communication devices to transport calls to, and receive calls from, other ATM capable communication devices. The ATM cells are then mapped into SONET frames to be transported and received over the SONET paths. Typically, the ATM cells are mapped to an OC-3 level or an STS-3c level communication. It should be noted that, for clarity, ATM cells that are mapped to SONET frames may be referred to below as ATM cells, without the reference to the SONET frame mapping. One skilled in the art will appreciate that ATM cells are mapped to and from SONET frames at the first and second interworking units 202 and 212.

When a call is to be connected, the first communication device 142 transports the call signaling to the signaling processor 104 over the link 166 in an appropriate format, such as SS7. The first communication device 142 transports the user communications to the first interworking unit 202 over the connection 144 in a communication format, such as a TDM format over a DS0 embedded in a DS3.

The signaling processor 104 receives the call signaling and processes the call signaling to determine connections for the call. The signaling processor 104 selects a first connection 118 over which the ATM formatted user communications will be transported from the first broadband interface 106. The selected first connection 118 is an ATM connection over a SONET path, such as a VPI/VCI in an OC-48 pipe. The signaling processor 104 transports a control message over the link 130 to the first interworking unit 202. The control message identifies the selected first connection 118.

The signaling processor 104 also processes the call signaling to determine a second connection 148 for the call over which the second interworking unit 212 will transport TDM formatted user communications to the second communication device 146. The selected second connection 148 is a TDM connection, such as a DS0 embedded in a DS3. The signaling processor 104 transports a control message over the link 132 to the second interworking unit 212. The control message identifies the selected second connection 148.

The first interworking unit 202 receives the control message from the signaling processor 104 and the user communications from the first communication device 142. The first interworking unit 202 interworks the TDM formatted user communications to ATM cells that identify the selected VPI/VCI of the first connection 118..

The ATM cells are mapped to SONET frames for the requisite OC level or STS level communication. The first interworking unit 202 then transports the ATM cells in the SONET frames to the first cross connect 204 over a connection 208. Preferably, the connection is an OC-3.

The first cross connect 204 receives the SONET frames containing the ATM cells. The first cross connect 204 removes the ATM cells from the SONET frames and cross connects the ATM cells through the ATM fabric to the appropriate provisioned virtual connection for the selected first connection 118. The first cross connect 204 maps the ATM cells back into SONET frames at the output of the first cross connect. The SONET frames containing the ATM cells are transported to the first ADM 206 over a provisioned path in the connection 210 for the VPI/VCI of the selected first connection 118. The connection 210 preferably is an OC level or an STS level connection, such as an OC-3. It can be seen that cells are transported to the correct connection when the correct VPI/VCI is selected.

The first ADM 206 receives the SONET frames containing the ATM cells from the first cross connect 204 over the connection 210. The first ADM 206 adds the frames on the provisioned broadband path on the SONET ring that has the corresponding provisioned VPI/VCI of the selected first connection 118. The SONET frames are transported over the SONET ring on, for example, an OC-48 to the second broadband interface 108.

The second ADM 216 receives the SONET frames containing the ATM cells over the selected first connection 118 of the SONET ring. The second ADM 216 drops the SONET frames containing the ATM cells from the SONET ring to the second cross connect 214.

The second cross connect 214 receives the SONET frames over the connection 220. The second cross connect 214 cross connects the SONET frames containing the ATM cells to the second interworking unit 212 over the provisioned path in the connection 218 that corresponds to the VPI/VCI in the ATM cells.

The second interworking unit 212 receives the SONET frames from the second cross connect 214 and the control message from the signaling processor 104. The second interworking unit 212 maps the SONET frames to the ATM cells. The second interworking unit 212 converts the ATM cells to TDM formatted user communications and transports the TDM formatted user communications to the second communication device 146 over the selected second connection 148.

Referring still to FIG. 2, a call may be connected from the second communication device 146 to the first communication device 142. The process for the connection and the transport of the user communications is the same as described above, except that the second broadband interface 108 transports the user communications as ATM cells mapped in SONET frames and the first broadband interface 106 receives the user communications as ATM cells mapped in the SONET frames.

Although the system is described above using SONET designations, the invention is equally applicable for use with SDH systems. For example, ATM cells may be mapped to STM-1 electrical/optical (E/O) frames in the SDH system instead of analogous STS-3c/OC-3 frames in a SONET system. Likewise, ATM cells and lower SDH level communications may be multiplexed or mapped up to STM-12 E/O communications in the SDH system instead of analogous STS-48/OC-48 communications in a SONET system.

Referring to FIGS. 1 and 2, it will be appreciated that the functions of the signaling processor 104, the first interworking unit 202, the first cross connect 204, and the first ADM 206 provide switching-type functions for ATM traffic being transported to communication devices in the SONET ring from the first broadband interface 106. Moreover, the functions of the signaling processor 104, the second interworking unit 212, the second cross connect 214, and the second ADM 216 provide switching-type functions for traffic being transported to communication devices, such as switches, from the SONET ring.

These switching functions give the broadband system 102 the ability to connect and switch calls to any location in the broadband system 102. This allows the broadband system to complete such functions as local number portability so that a telephone service customer can switch services from, for example, the ILEC 154 to the CLEC 158 and keep the same local telephone number. Other services, including intelligent network services, also may be provided.

The present invention as explained above may be adapted for use with other devices or with fewer devices. For example, the first broadband interface 106 may be adapted to be used without the cross connect 204. However, some switching functionality may be eliminated because broadband paths then would be provisioned to the first interworking unit 202, and the first interworking unit would have to select the broadband path. Multiple SONET paths may be provisioned from the first interworking unit 202 to each call destination.

Figure 3:
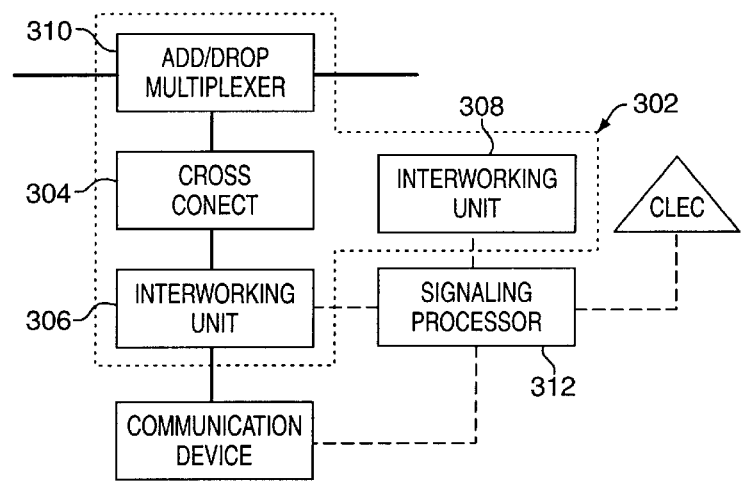
FIG. 3 is a block diagram of a broadband interface in which multiple interworking units are attached to a cross connect.

As illustrated in FIG. 3, the broadband interface 302 may have multiple interworking units or cross connects. Thus, a cross connect 304 may be connected to a first interworking unit 306 and to a second interworking unit 308, in addition to an ADM 310. A signaling processor 312 processes call signaling and determines connections and processing for the components of the broadband interface 302. The first and second interworking units 306 and 308 may be in the same proximate location or in different proximate locations. Moreover, the cross connect 304 or other components may be connected to another cross connect or to a gateway (not shown).

Figure 4:
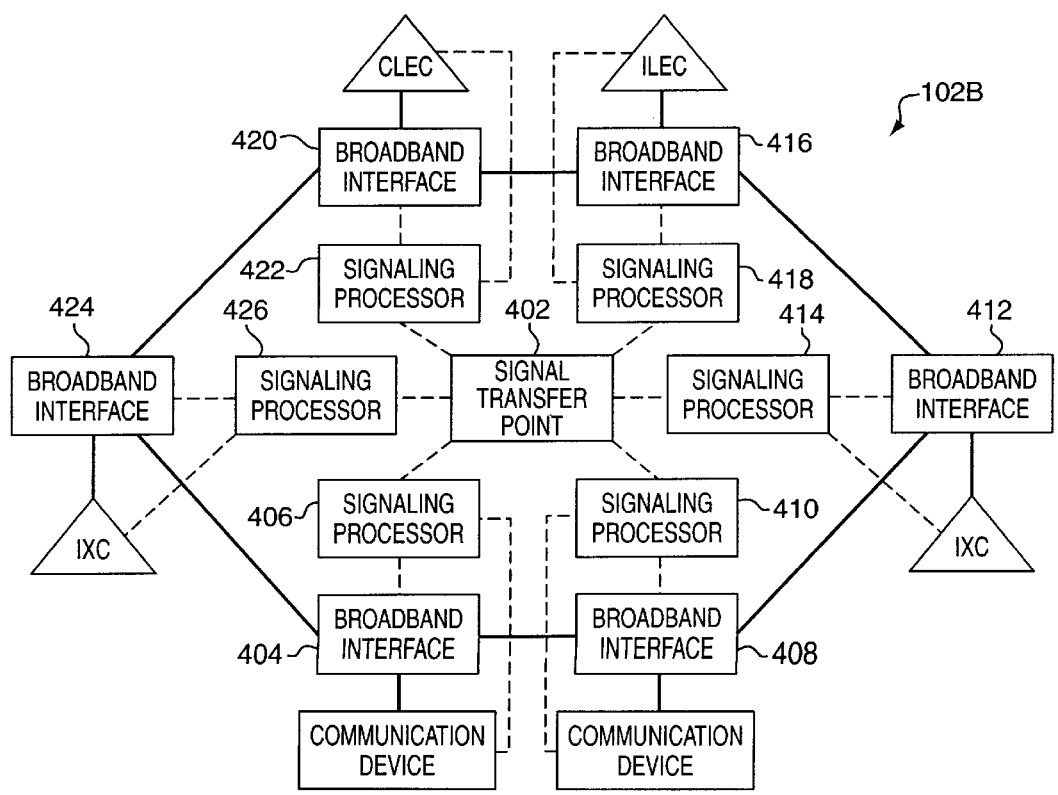
FIG. 4 is a block diagram of a broadband metropolitan area network with a plurality of broadband interfaces each attached to a signaling processor which communicate with a signal transfer point.

As illustrated in FIG. 4, the broadband system 102B may use an STP 404. In addition, the broadband system 102B may be configured so that a plurality of broadband interfaces are each connected to its own signaling processor. In this configuration, the broadband system 102B has a first broadband interface 404 linked to a first signaling processor 406, a second broadband interface 408 linked to a second signaling processor 410, a third broadband interface 412 linked to a third signaling processor 414, a fourth broadband interface 416 linked to a fourth signaling processor 418, a fifth broadband interface 420 linked to a fifth signaling processor 422, and a sixth broadband interface 424 linked to a sixth signaling processor 426. Each of the signaling processors 406, 410, 414, 418, 422, and 426 are linked to the STP 402. For clarity, the links and the connections are not referenced.

In addition, it will be appreciated that the system of the present invention may connect calls for a variety of communication devices. For example, a broadband interface may be connected to a class 4 switch, a class 5 switch, or a class 4/5 switch. These switches may, in turn, be connected to other class 4, class 5, or class 4/5 switches. The broadband system and broadband interfaces may be used to connect and process calls in a local architecture or in an interexchange architecture. In addition, the broadband system and broadband interfaces may be used to connect and process calls in facility based and non-facility based traffic. Moreover, the broadband interfaces may connect to in-band signaling communication devices as well as the out-of-band signaling communication devices.

The ATM Interworking Unit

Figure 5:
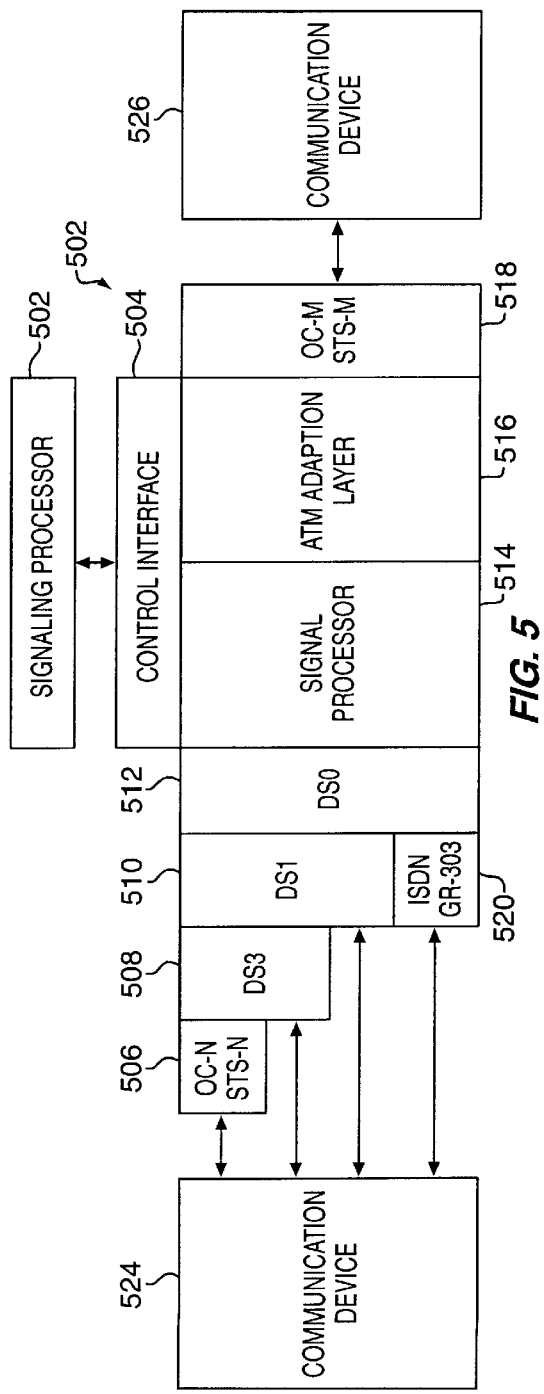
FIG. 5 is a functional diagram of an asynchronous transfer mode interworking unit for use with a synchronous optical network system in accordance with the present invention.

FIG. 5 shows one embodiment of an interworking unit which is an ATM interworking unit 502 suitable for the present invention for use with a SONET system, but other interworking units that support the requirements of the invention are also applicable. The ATM interworking unit 502 may receive and transmit in-band and out-of-band calls.

The ATM interworking unit 502 has a control interface 504, an OC-N/STS-N interface 506, a DS3 interface 508, a DS1 interface 510, a DS0 interface 512, a signal processor 514, an ATM adaptation layer (AAL) 516, an OC-M/STS-M interface 518, and an ISDN/GR-303 interface 520. As used herein in conjunction with OC or STS, "N" refers to an integer, and "M" refers to an integer.

The control interface 502 accepts control messages from the signaling processor 522. In particular, the control interface 504 identifies DS0 connections and virtual connection assignments in the control messages from the signaling processor 522. These assignments are provided to the AAL 516 for implementation.

The OC-N/STS-N interface 506, the DS3 interface 508, the DS1 interface 510, the DS0 interface 512, and the ISDN/GR-303 interface 520 each can accept calls, including user communications, from a communication device 524. Likewise, the OC-M/STS-M interface 518 can accept calls, including user communications, from a communication device 526.

The OC-N/STS-N interface 506 accepts OC-N formatted calls and STS-N formatted calls and converts the calls from the OC-N or STS-N formats to the DS3 format. The DS3 interface 508 accepts calls in the DS3 format and converts the calls to the DS1 format. The DS3 interface 508 can accept DS3s from the OC-N/STS-N interface 506 or from an external connection. The DS1 interface 510 accepts the calls in the DS1 format and converts the calls to the DS0 format. The DS1 interface 510 can accept DS1s from the DS3 interface 508 or from an external connection. The DS0 interface 512 accepts calls in the DS0 format and provides an interface to the AAL 516. The ISDN/GR-303 interface 520 accepts calls in either the ISDN format or the GR-303 format and converts the calls to the DS0 format. In addition, each interface may transmit signals in like manner to the communication device 524.

The OC-M/STS-M interface 518 is operational to accept ATM cells from the AAL 516 and to transmit the ATM cells over the connection to the communication device 526. The OC-M/STS-M interface 518 may also accept ATM cells in the OC or STS format and transmit them to the AAL 516.

The AAL 516 comprises both a convergence sublayer and a segmentation and reassembly (SAR) sublayer. The AAL 516 is operational to accept communication device information in the DS0 format from the DS0 interface 512 and to convert the communication device information into ATM cells. AALs are known in the art and information about AALs is provided by International Telecommunications Union (ITU) document I.363, which is incorporated fully herein by reference. An AAL for voice calls is described in U.S. patent application Ser. No. 08/395,745, which was filed on Feb. 28, 1995, and entitled "Cell Processing for Voice Transmission," and which is incorporated herein by reference.

The AAL 516 obtains from the control interface 504 the virtual path identifier (VPI) and the virtual channel identifier (VCI) for each DS0 for each call connection. The AAL 516 also obtains the identity of the DS0 for each call (or the DS0s for an N×64 call). The AAL 516 then transfers the communication device information between the identified DS0 and the identified ATM virtual connection. An acknowledgment that the assignments have been implemented may be sent to the signaling processor 522 if desired. Calls with multiple 64 Kilo-bits per second (Kbps) DS0s are known as N×64 calls. If desired, the AAL 516 can be configured to accept control messages through the control interface 504 for N×64 calls.

As discussed above, the ATM interworking unit 502 also handles calls in the opposite direction, that is, in the direction from the OC-M/STS-M interface 518 to the DS0 interface 512, including calls exiting from the DS1 interface 510, the DS3 interface 508, the OC-N/STS-N interface 506, and the ISDN/GR-303 interface 520. For this traffic, the VPI/VCI has been selected already and the traffic has been routed through the cross-connect (not shown). As a result, the AAL 516 only needs to identify the pre-assigned DS0 for the selected VPI/VCI. This can be accomplished through a look-up table. In alternative embodiments, the signaling processor 522 can provide this DS0-VPI/VCI assignment through the control interface 504 to the AAL 516.

A technique for processing VPI/VCIs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VPI/VCIs in the opposite direction as the original set of VPI/VCIs. For each call, ATM interworking multiplexers would be configured to invoke automatically this second VPI/VCI to provide a bi-directional virtual connection to match the bi-directional DS0 on the call.

In some embodiments, it may be desirable to incorporate digital signal processing capabilities at the DS0 level. It may also be desired to apply echo cancellation to selected DS0 circuits. In these embodiments, a signal processor 514 would be included either separately (as shown) or as a part of the DS0 interface 512. The signaling processor 522 would be configured to send control messages to the ATM interworking unit 502 to implement particular features on particular DS0 circuits. Alternatively, lookup tables may be used to implement particular features for particular circuits or VPIs/VCIs.

Figure 6:
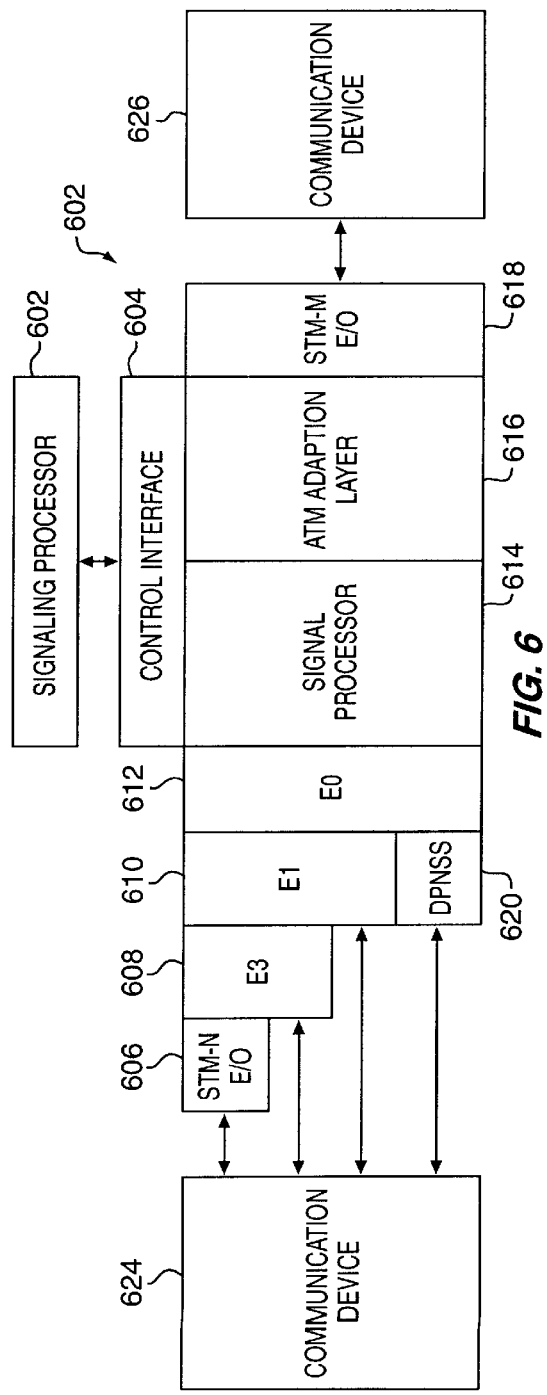
FIG. 6 is a functional diagram of an asynchronous transfer mode interworking unit for use with a synchronous digital hierarchy system in accordance with the present invention.

FIG. 6 shows another embodiment of an interworking unit which is an ATM interworking unit 602 suitable for the present invention. The ATM interworking unit 502 may receive and transmit in-band and out-of-band calls.

The ATM interworking unit 602 is for use with an SDH system and has a control interface 604, an STM-N electrical/optical (E/O) interface 606, an E3 interface 608, an E1 interface 610, an E0 interface 612, a signal processor 614, an ATM adaptation layer (AAL) 616, an STM-M electrical/optical (E/O) interface 618, and a digital private network signaling system (DPNSS) interface 620. As used herein in conjunction with STM, "N" refers to an integer, and "M" refers to an integer.

The control interface 604 accepts control messages from the signaling processor 622. In particular, the control interface 604 identifies E0 connections and virtual connection assignments in the control messages from the signaling processor 622. These assignments are provided to the AAL 616 for implementation.

The STM-N E/O interface 606, the E3 interface 608, the E1 interface 610, the E0 interface 612, and the DPNSS interface 620 each can accept calls, including user communications, from a second communication device 624. Likewise, the STM-M E/O interface 618 can accept calls, including user communications, from a third communication device 626.

The STM-N E/O interface 606 accepts STM-N electrical or optical formatted calls and converts the calls from the STM-N electrical or STM-N optical format to the E3 format. The E3 interface 608 accepts calls in the E3 format and converts the calls to the E1 format. The E3 interface 608 can accept E3s from the STM-N E/O interface 606 or from an external connection. The E1 interface 610 accepts the calls in the E1 format and converts the calls to the E0 format. The E1 interface 610 can accept E1s from the STM-N E/O interface 606 or the E3 interface 608 or from an external connection. The E0 interface 612 accepts calls in the E0 format and provides an interface to the AAL 616. The DPNSS interface 620 accepts calls in the DPNSS format and converts the calls to the E0 format. In addition, each interface may transmit signals in a like manner to the communication device 624.

The STM-M E/O interface 618 is operational to accept ATM cells from the AAL 616 and to transmit the ATM cells over the connection to the communication device 626. The STM-M E/O interface 618 may also accept ATM cells in the STM-M E/O format and transmit them to the AAL 616.

The AAL 616 comprises both a convergence sublayer and a segmentation and reassembly (SAR) sublayer. The AAL 616 is operational to accept communication device information in the E0 format from the E0 interface 612 and to convert the communication device information into ATM cells.

The AAL 616 obtains from the control interface 604 the virtual path identifier and the virtual channel identifier for each call connection. The AAL 616 also obtains the identity of each call. The AAL 616 then transfers the communication device information between the identified E0 and the identified ATM virtual connection. An acknowledgment that the assignments have been implemented may be sent back to the signaling processor 622 if desired. If desired, the AAL 616 can be configured to accept control messages through the control interface 604 for N×64 calls.

As discussed above, the ATM interworking unit 602 also handles calls in the opposite direction, that is, in the direction from the STM-M E/O interface 618 to the E0 interface 612, including calls exiting from the E1 interface 610, the E3 interface 608, the STM-N E/O interface 606, and the DPNSS interface 620. For this traffic, the VPI/VCI has been selected already and the traffic has been routed through the cross-connect (not shown). As a result, the AAL 616 only needs to identify the pre-assigned E0 for the selected VPI/VCI. This can be accomplished through a look-up table. In alternative embodiments, the signaling processor 622 can provide this VPI/VCI assignment through the control interface 604 to the AAL 616.

E0 connections are bi-directional and ATM connections typically are uni-directional. As a result, two virtual connections in opposing directions typically will be required for each E0. Those skilled in the art will appreciate how this can be accomplished in the context of the invention. For example, the cross-connect can be provisioned with a second set of VPI/VCIs in the opposite direction as the original set of VPI/VCIs. For each call, ATM interworking multiplexers would be configured to automatically invoke this second VPI/VCI to provide a bi-directional virtual connection to match the bi-directional E0 on the call.

In some instances, it may be desirable to incorporate digital signal processing capabilities at the E0 level. Also, it may be desirable apply echo cancellation. In these embodiments, a signal processor 614 would be included either separately (as shown) or as a part of the E0 interface 612. The signaling processor 622 would be configured to send control messages to the ATM interworking unit 602 to implement particular features on particular circuits. Alternatively, lookup tables may be used to implement particular features for particular circuits or VPIs/VCIs.

The Signaling Processor

The signaling processor is referred to as a call/connection manager (CCM), and it receives and processes telecommunications call signaling and control messages to select connections that establish communication paths for calls. In the preferred embodiment, the CCM processes ISDN, GR-303, and SS7 signaling to select connections for a call. CCM processing is described in a U.S. patent application having attorney docket number 1148, which is entitled "Telecommunication System," which is assigned to the same assignee as this patent application, and which is incorporated herein by reference.

In addition to selecting connections, the CCM performs many other functions in the context of call processing. It not only can control routing and select the actual connections, but it also can validate callers, control echo cancelers, generate billing information, invoke intelligent network functions, access remote databases, manage traffic, and balance network loads. One skilled in the art will appreciate how the CCM described below can be adapted to operate in the above embodiments.

Figure 7:
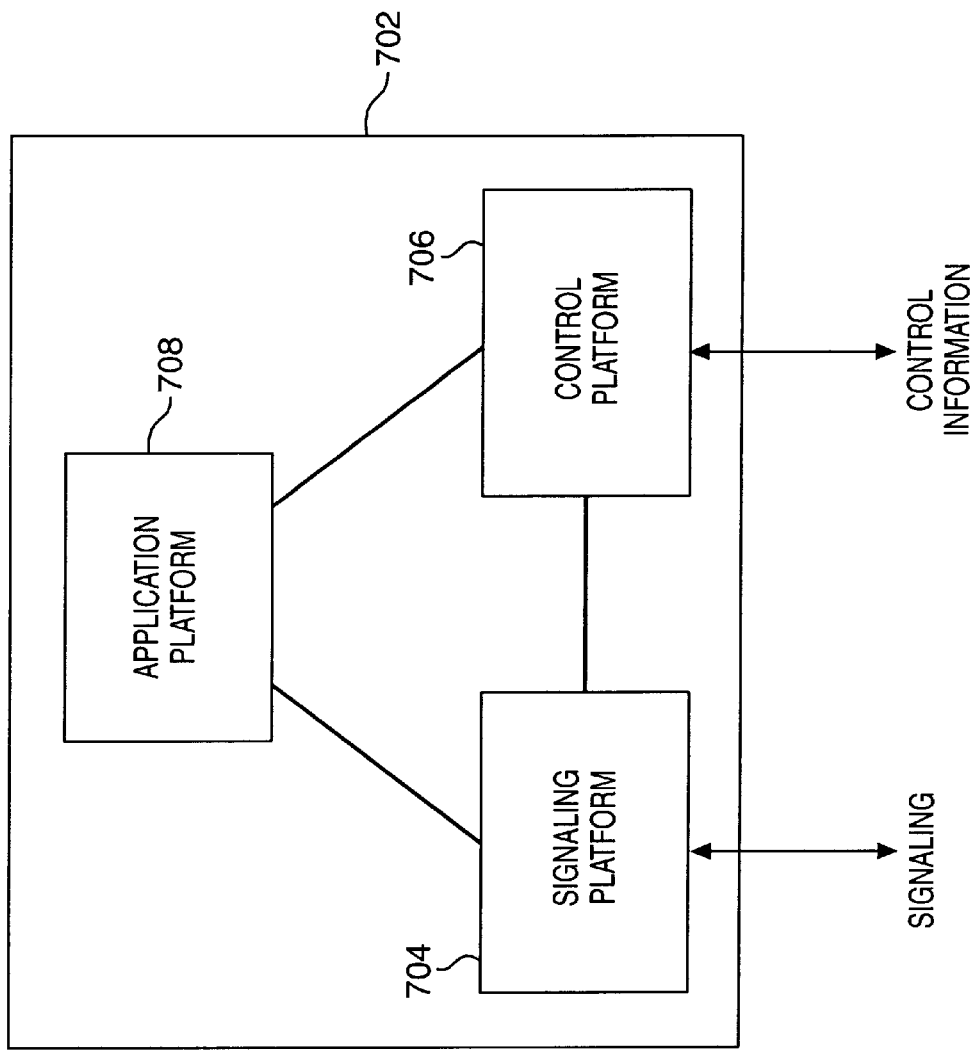
FIG. 7 is a block diagram of a signaling processor constructed in accordance with the present system.

FIG. 7 depicts a version of the CCM. Other versions also are contemplated. In the embodiment of FIG. 7, the CCM 702 controls an ATM interworking unit, such as an ATM interworking multiplexer (mux) that performs interworking of DS0s and VPI/VCIs. However, the CCM may control other communications devices and connections in other embodiments.

The CCM 702 comprises a signaling platform 704, a control platform 706, and an application platform 708. Each of the platforms 704, 706, and 708 is coupled to the other platforms.

The signaling platform 704 is externally coupled to the signaling systems—in particular to SS7 signaling systems having a message transfer part (MTP), an ISDN user part (ISUP), a signaling connection control part (SCCP), an intelligent network application part (INAP), and a transaction capabilities application part (TCAP). The control platform 706 is externally coupled to an interworking unit control, an echo control, a resource control, billing, and operations.

The signaling platform 704 preferably is an SS7 platform that comprises MTP levels 1–3, ISUP, TCAP, SCCP, and INAP functionality and is operational to transmit and receive the SS7 messages. The ISUP, SCCP, INAP, and TCAP functionality use MTP to transmit and receive the SS7 messages. Together, this functionality is referred as an "SS7 stack," and it is well known. The software required by one skilled in the art to configure an SS7 stack is commercially available, for example, from the Trillium company.

The control platform 706 is comprised of various external interfaces including an interworking unit interface, an echo interface, a resource control interface, a billing interface, and an operations interface. The interworking unit interface exchanges messages with at least one interworking unit. These messages comprise DS0 to VPI/VCI assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The billing interface transfers pertinent billing information to a billing system. Typical billing information includes the parties to the call, time points for the call, and any special features applied to the call. The operations interface allows for the configuration and control of the CCM 702. One skilled in the art will appreciate how to produce the software for the interfaces in the control platform 706.

The application platform 708 is functional to process signaling information from the signaling platform 704 in order to select connections. The identity of the selected connections are provided to the control platform 706 for the interworking unit interface. The application platform 708 is responsible for validation, translation, routing, call control, exceptions, screening, and error handling. In addition to providing the control requirements for the interworking unit, the application platform 708 also provides requirements for echo control and resource control to the appropriate interface of the control platform 706. In addition, the application platform 708 generates signaling information for transmission by the signaling platform 704. The signaling information might be ISUP, INAP, or TCAP messages to external network elements. Pertinent information for each call is stored in a call control block (CCB) for the call. The CCB can be used for tracking and billing the call.

The application platform 708 operates in general accord with the Basic Call Model (BCM) defined by the ITU. An instance of the BCM is created to handle each call. The BCM includes an originating process and a terminating process. The application platform 708 includes a service switching function (SSF) that is used to invoke the service control function (SCF). Typically, the SCF is contained in a service control point (SCP). The SCF is queried with TCAP or INAP messages. The originating or terminating processes will access remote databases with intelligent network (IN) functionality via the SSF function.

Software requirements for the application platform 708 can be produced in specification and description language (SDL) defined in ITU-T Z.100. The SDL can be converted into C code. Additional C and C++ code can be added as required to establish the environment.

The CCM 702 can be comprised of the above-described software loaded onto a computer. The computer can be an Integrated Micro Products (IMP) FT-Sparc 600 using the Solaris operating system and conventional database systems. It may be desirable to utilize the multi-threading capability of a Unix operating system.

From FIG. 7, it can be seen that the application platform 708 processes signaling information to control numerous systems and facilitate call connections and services. The SS7 signaling is exchanged with external components through the signaling platform 704, and control information is exchanged with external systems through the control platform 706. Advantageously, the CCM 702 is not integrated into a switch central processing unit (CPU) that is coupled to a switching matrix. Unlike an SCP, the CCM 702 is capable of processing ISUP messages independently of TCAP queries.

SS7 Message Designations

SS7 messages are well known. Designations for various SS7 messages commonly are used. Those skilled in the art are familiar with the following message designations:

| ACM | Address Complete Message |
| --- | --- |
| ANM | Answer Message |
| BLO | Blocking |
| BLA | Blocking Acknowledgment |
| CPG | Call Progress |
| CRG | Charge Information |
| CGB | Circuit Group Blocking |
| CGBA | Circuit Group Blocking Acknowledgment |
| GRS | Circuit Group Reset |
| GRA | Circuit Group Reset Acknowledgment |
| CGU | Circuit Group Unblocking |
| CGUA | Circuit Group Unblocking Acknowledgment |
| CQM | Circuit Group Query |
| CQR | Circuit Group Query Response |
| CRM | Circuit Reservation Message |
| CRA | Circuit Reservation Acknowledgment |
| CVT | Circuit Validation Test |
| CVR | Circuit Validation Response |
| CFN | Confusion |
| COT | Continuity |
| CCR | Continuity Check Request |
| EXM | Exit Message |
| INF | Information |
| INR | Information Request |
| IAM | Initial Address |
| LPA | Loop Back Acknowledgment |
| PAM | Pass Along |
| REL | Release |
| RLC | Release Complete |
| RSC | Reset Circuit |
| RES | Resume |
| SUS | Suspend |
| UBL | Unblocking |
| UBA | Unblocking Acknowledgment |
| UCIC | Unequipped Circuit Identification Code. |

CCM Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 8:
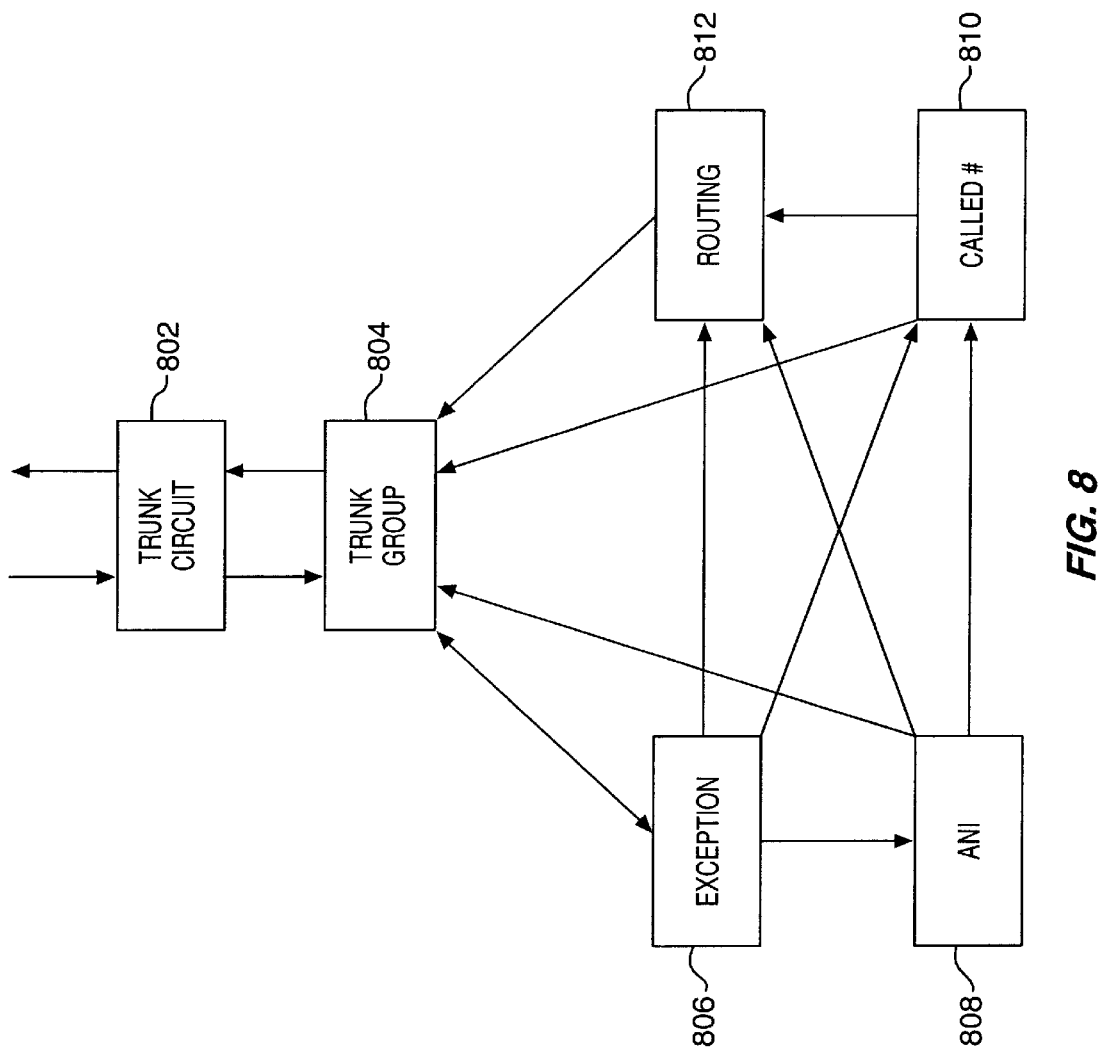
FIG. 8 is a block diagram of a data structure having tables that are used in the signaling processor of FIG. 7.

FIG. 8 depicts a data structure used by the application platform 708 to execute the BCM. This is accomplished through a series of tables that point to one another in various ways. The pointers are typically comprised of next function and next index designations. The next function points to the next table, and the next index points to an entry or a range of entries in that table. The data structure has a trunk circuit table 802, a trunk group table 804, an exception table 806, an ANI table 808, a called number table 810, and a routing table 812.

The trunk circuit table 802 contains information related to the connections. Typically, the connections are DS0 or ATM connections. Initially, the trunk circuit table 802 is used to retrieve information about the originating connection. Later, the table is used to retrieve information about the terminating connection. When the originating connection is being processed, the trunk group number in the trunk circuit table 802 points to the applicable trunk group for the originating connection in the trunk group table 804.

The trunk group table 804 contains information related to the originating and terminating trunk groups. When the originating connection is being processed, the trunk group table 804 provides information relevant to the trunk group for the originating connection and typically points to the exception table 806.

The exception table 806 is used to identify various exception conditions related to the call that may influence the routing or other handling of the call. Typically, the exception table 806 points to the ANI table 808. Although, the exception table 806 may point directly to the trunk group table 804, the called number table 810, or the routing table 812.

The ANI table 808 is used to identify any special characteristics related to the caller's number. The caller's number is commonly known as automatic number identification (ANI). The ANI table 808 typically points to the called number table 810. Although, the ANI table 808 may point directly to the trunk group table 804 or the routing table 812.

The called number table 810 is used to identify routing requirements based on the called number. This will be the case for standard telephone calls. The called number table 810 typically points to the routing table 812. Although, it may point to the trunk group table 804.

The routing table 812 has information relating to the routing of the call for the various connections. The routing table 812 is entered from a pointer in the exception table 806, the ANI table 808, or the called number table 810. The routing table 812 typically points to a trunk group in the trunk group table 804.

When the exception table 806, the ANI table 808, the called number table 810, or the routing table 812 point to the trunk group table 804, they effectively select the terminating trunk group. When the terminating connection is being processed, the trunk group number in the trunk group table 804 points to the trunk group that contains the applicable terminating connection in the trunk circuit table 804.

The terminating trunk circuit is used to extend the call. The trunk circuit is typically a VPI/VCI or a DS0. Thus, it can be seen that by migrating through the tables, a terminating connection can be selected for a call.

Figure 9:
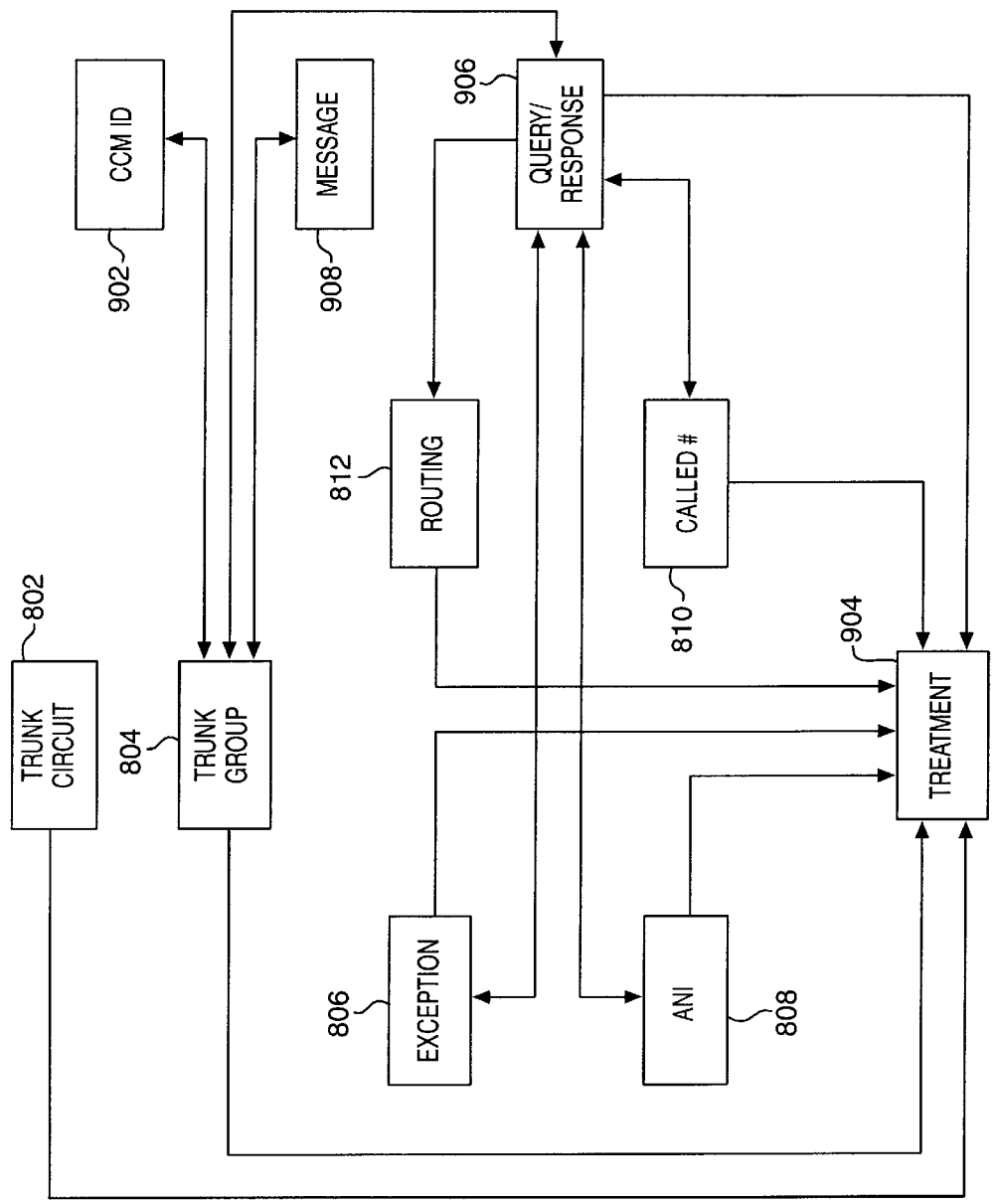
FIG. 9 is a block diagram of additional tables that are used in the signaling processor of FIG. 8.

FIG. 9 is an overlay of FIG. 8. The tables from FIG. 8 are present, but for clarity, their pointers have been omitted. FIG. 9 illustrates additional tables that can be accessed from the tables of FIG. 8. These include a CCM ID table 902, a treatment table 904, a query/response table 906, and a message table 908.

The CCM ID table 902 contains various CCM SS7 point codes. It can be accessed from the trunk group table 804, and it points back to the trunk group table 804.

The treatment table 904 identifies various special actions to be taken in the course of call processing. This will typically result in the transmission of a release message (REL) and a cause value. The treatment table 904 can be accessed from the trunk circuit table 802, the trunk group table 804, the exception table 806, the ANI table 808, the called number table 810, the routing table 812, and the query/response table 906.

The query/response table 906 has information used to invoke the SCF. It can be accessed by the trunk group table 804, the exception table 806, the ANI table 808, the called number table 810, and the routing table 812. It points to the trunk group table 804, the exception table 806, the ANI table 808, the called number table 810, the routing table 812, and the treatment table 904.

The message table 908 is used to provide instructions for messages from the termination side of the call. It can be accessed by the trunk group table 804 and points to the trunk group table 804.

FIGS. 14–21 depict examples of the various tables described above. FIG. 10 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or CCM associated with the originating circuit. For terminating circuit processing, the trunk group number is used to enter the table.

The table also contains the circuit identification code (CIC). The CIC identifies the circuit which is typically a DS0 or a VPI/VCI. Thus, the invention is capable of mapping the SS7 CICs to the ATM VPI/VCI. If the circuit is ATM, the virtual path (VP) and the virtual channel (VC) also can be used for identification. The group member number is a numeric code that is used for terminating circuit selection. The hardware identifier identifies the location of the hardware associated with the originating circuit. The echo canceler (EC) identification (ID) entry identifies the echo canceler for the originating circuit.

The remaining fields are dynamic in that they are filled during call processing. The echo control entry is filled based on three fields in signaling messages: the echo suppresser indicator in the IAM or CRM, the echo control device indicator in the ACM or CPM, and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 11 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the CCM controls all of the circuits. If the glare resolution entry is set to "none," the CCM yields. The continuity control entry lists the percent of calls requiring continuity tests on the trunk group.

The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a CCM (ATM) or a switch (TDM). The outgoing message index (OMI) points to the message table so that outgoing messages can obtain parameters. The associated number plan area (NPA) entry identifies the area code.

Selection sequence indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the CCM may release the call. During termination processing, the next function and index are used to enter the trunk circuit table.

FIG. 12 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network. The called party number nature of address differentiates between 0+ calls, 1+ calls, test calls, and international calls. For example, international calls might be routed to a pre-selected international carrier.

The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 13 depicts an example of the ANI table. The index is used to enter the fields of the table. The calling party category differentiates among types of calling parties, for example, test calls, emergency calls, and ordinary calls. The calling party\charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800\888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 14 depicts an example of the called number table. The index is used to enter the table. The called number nature of address entry indicates the type of dialed number, for example, national versus international. The "digits from" and "digits to" entries focus further processing unique to a range of called numbers. The processing follows the processing logic of the "digits from" and "digits to" fields in FIG. 12. The next function and next index point to the next table which is typically the routing table.

FIG. 15 depicts an example of the routing table. The index is used to enter the table. The transit network selection (TNS) network identification (ID) plan indicates the number of digits to use for the CIC. The transit network selection "digits from" and "digits to" fields define the range of numbers to identify an international carrier. The circuit code indicates the need for an operator on the call. The next function and next index entries in the routing table are used to identify a trunk group. The second and third next function/index entries define alternate routes. The third next function entry can also point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 14–19 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number, routing, trunk group, and trunk circuit.

FIG. 16 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in a REL from the CCM. The next function and next index point to the next table.

FIG. 17 depicts an example of the message table. This table allows the CCM to alter information in outgoing messages. Message type is used to enter the table, and it represents the outgoing standard SS7 message type. The parameter is the pertinent parameter within the outgoing SS7 message. The indexes point to various entries in the trunk group table and determine if parameters can be unchanged, omitted, or modified in the outgoing messages.

Those skilled in the art will appreciate that variations from the specific embodiments disclosed above are contemplated by the invention. The invention should not be restricted to the above embodiments, but should be measured by the following claims.

What is claimed is:

1. A broadband system for connecting calls that use time division multiplexing, the system comprising:

a SONET ring adapted to interconnect devices coupled to the SONET ring, the SONET ring comprising SONET multiplexers coupled by SONET paths, wherein the SONET multiplexers are adapted to add calls to, and drop calls from, the SONET ring;

an ATM cross connect system coupled to the SONET ring comprising ATM cross connect devices, the ATM cross connect devices adapted to provide provisioned ATM connections over the SONET ring;

a plurality of ATM interworking units coupled to the ATM cross connect system, the ATM interworking units adapted to interwork calls with selected ATM connections in response to control messages, wherein the selected ATM connections are provisioned between selected ATM interworking units by the ATM cross connect system over the SONET ring; and a signaling processor system adapted to receive call signaling for the calls, to process the call signaling to select the ATM connections for the calls, and to send the control messages to the selected ATM interworking units designating the selected ATM connections, to receive particular call signaling for a particular call, to select a particular ATM connection between a selected first ATM interworking unit and a selected second ATM interworking unit for the particular call, to send a particular control message to the selected first ATM interworking unit designating the particular ATM connection, to select a particular TDM connection, and to transport a second control message to the selected second ATM interworking unit designating the particular TDM connection;

the ATM cross connect system is further adapted to provision the selected particular ATM connection between the selected first ATM interworking unit and selected second ATM interworking unit over the SONET ring; and the selected first ATM interworking unit is adapted to interwork the particular call with the selected particular ATM connection;

the selected second ATM interworking unit is adapted to receive the second control message from the signaling processing system, to receive the call over the selected particular ATM connection, and to interwork the call with particular TDM connection.

2. The system of claim 1 wherein the selected ATM connections are provisioned by the ATM cross connect system before calls are initiated.

3. The system of claim 1 further comprising a communication device adapted to transport one of the calls that is connected by the broadband system.

4. The system of claim 3 wherein the communication device comprises a local exchange carrier.

5. The system of claim 3 wherein the communication device comprises an interexchange carrier.

6. The system of claim 3 wherein the communication device comprises a service platform.

7. The system of claim 3 wherein the communication device comprises a circuit-based switch.

8. The system of claim 1 further comprising a communication device adapted to receive one of the calls that is connected by the broadband system.

9. The system of claim 8 wherein the communication device comprises a local exchange carrier.

10. The system of claim 8 wherein the communication device comprises an interexchange carrier.

11. The system of claim 8 wherein the communication device comprises a service platform.

12. The system of claim 8 wherein the communication device comprises a circuit-based switch.

13. The system of claim 1 wherein user communications for calls are interworked by ATM interworking units to ATM cells which are mapped to SONET frames, and wherein the ATM interworking units transport the SONET frames over the selected ATM connections.

14. The system of claim 1 wherein the ATM interworking units map SONET frames to ATM cells and interwork the ATM cells to non-ATM user communications.

15. The system of claim 1 wherein the broadband system comprises a metropolitan area network.

16. The system of claim 1 wherein the processing system comprises a plurality of signaling processors linked by links, wherein the signaling processors are linked to the ATM interworking units and are adapted to send the control messages to the ATM interworking units designating the ATM connection.

17. The system of claim 16 wherein the signaling processing system comprises a signal transfer point adapted to transfer call signaling between the signaling processors.

18. A broadband system for connecting a call over a SONET ring that is adapted to interconnect devices coupled to the SONET ring, the call having a time division multiplex format and having user communications and call signaling, the system comprising:

a SONET multiplexer coupled to the SONET ring, the SONET multiplexer adapted to add the call to the SONET ring;

an ATM cross connect coupled to the SONET multiplexer, the ATM cross connect adapted to provide a provisioned ATM connection through the SONET multiplexer over the SONET ring;

an ATM interworking unit coupled to the ATM cross connect, the ATM interworking unit adapted to interwork the user communications with the ATM connection in response to a control message, wherein the ATM connection is provisioned by the ATM cross connect from the ATM interworking unit through the SONET multiplexer over the SONET ring;

a signaling processor adapted to process the call signaling to select the ATM connection for the call from among a plurality of connections and to send the control message to the ATM interworking unit designating the ATM connection, to select a second connection and to transport a second control message designating the second connection;

a second SONET multiplexer adapted to drop the call from the SONET ring;

a second ATM cross connect adapted to provide the provisioned ATM connection through the second SONET multiplexer; and a second ATM interworking unit adapted to receive the call from the ATM connection through the second SONET multiplexer and through the second ATM cross connect, to receive the second control message from the signaling processor, to convert the call to user communications having a second communication format, and to transport the user communications over the selected second connection.

19. The system of claim 18 wherein the provisioned ATM connection is provisioned by the ATM cross connect system before the call is initiated.

20. The system of claim 18 further comprising a communication device adapted to transport the call signaling to the signaling processor and to transport the user communications to the ATM interworking unit.

21. The system of claim 18 wherein the communication device comprises a local exchange carrier.

22. The system of claim 18 wherein the communication device comprises an interexchange carrier.

23. The system of claim 18 wherein the communication device comprises a service platform.

24. The system of claim 18 wherein the communication device comprises a circuit-based switch.

25. The system of claim 18 further comprising a communication device adapted to receive the user communications in the second communication format from the second ATM interworking unit over the second connection.

26. The system of claim 25 wherein the communication device comprises a local exchange carrier.

27. The system of claim 25 wherein the communication device comprises an interexchange carrier.

28. The system of claim 25 wherein the communication device comprises a service platform.

29. The system of claim 25 wherein the communication device comprises a circuit-based switch.

30. The system of claim 25 wherein the broadband system comprises a metropolitan area network.

31. A broadband system for connecting a call over a SONET ring that is adapted to interconnect devices coupled to the SONET ring, the call having call signaling and user communications, the system comprising:

a signaling processor adapted to receive the call signaling for the call, to process the call signaling to select an ATM connection for the call, to send a control message designating the selected ATM connection, to select a second non-ATM connection, and to transport a second control message designating the second non-ATM connection;

an ATM interworking unit adapted to receive the control message from the signaling processor, to receive the user communications, and to interwork the user communications for the call between a non-ATM connection and the selected ATM connection in response to the control message;

a SONET multiplexer adapted to provide access to the SONET ring for the selected ATM connection; and an ATM cross connect adapted to provision the selected ATM connection from the ATM interworking unit through the SONET multiplexer over the SONET ring;

wherein the call is transported over the provisioned selected ATM connection from the ATM interworking unit, through the ATM cross connect, through the SONET multiplexer, and over the SONET ring;

a second SONET multiplexer adapted to drop the call from the SONET ring;

a second ATM cross connect adapted to provide the provisioned ATM connection through the second SONET multiplexer; and a second ATM interworking unit adapted to receive the call from the ATM connection through the second SONET multiplexer and through the second ATM cross connect, to receive the second control message from the signaling processor, to convert the call to user communications having a second communication format, and to transport the user communications over the selected second non-ATM connection.

32. The system of claim 31 further comprising a communication device adapted to transport the call signaling to the signaling processor and the user communications to the ATM interworking unit.

33. The system of claim 31 further comprising a communication device adapted to receive the user communications in the second communication format from the second ATM interworking unit over the non-ATM connection.

34. The system of claim 31 wherein the broadband system comprises a metropolitan area network.

35. A broadband system for connecting a call having a time division multiplex format over a broadband ring, the call having call signaling and user communications, the system comprising:

a signaling processor adapted to receive the call signaling for the call, to process the call signaling to select a selected connection for the call from among a plurality of connections, to send the control message designating the selected connection, to select a second connection, and to transport a second control message designating the second connection;

an add/drop multiplexer adapted to provide the call access to the broadband ring;

a cross connect adapted to provision the selected connection through the add/drop multiplexer over the broadband ring;

an interworking unit adapted to receive the user communications and to receive the control message from the signaling processor and, in response thereto, to interwork the user communications for the call to asynchronous transfer mode cells that identify the selected connection, to map the asynchronous transfer mode cells to broadband frames, and to transport the broadband frames over the selected connection;

wherein the connection is provisioned by the cross connect from the interworking unit through the add/drop multiplexer over the broadband ring;

a second add/drop multiplexer adapted to drop the call from the broadband ring;

a second cross connect adapted to provide the provisioned selected connection through the second add/drop multiplexer; and a second interworking unit adapted to receive the call from the selected connection through the second add/drop multiplexer and through the second cross connect, to receive the second control message from the signaling processor, to convert the call to user communications having a second communication format, and to transport the user communications over the selected second connection.

36. The system of claim 35 further comprising a communication device adapted to transport the call signaling to the signaling processor and the user communications to the interworking unit.

37. The system of claim 35 further comprising a communication device adapted to receive the user communications in the second communication format from the second interworking unit over the second connection.

38. The system of claim 35 wherein the broadband system comprises a metropolitan area network.

39. The system of claim 35 wherein the broadband system comprises a synchronous optical network system and wherein the asynchronous transfer mode cells are mapped to synchronous optical network frames in the interworking unit, and wherein the interworking unit transports the synchronous optical network frames.

40. The system of claim 35 wherein the broadband system comprises a synchronous digital hierarchy system and wherein the asynchronous transfer mode cells are mapped to synchronous digital hierarchy frames in the interworking unit, and wherein the interworking unit transports the synchronous digital hierarchy frames.

41. A system for connecting a call in a broadband system, the call having user communications and call signaling, the system comprising:

a first communication device adapted to transport the call;

a second communication device adapted to receive the call;

a signaling processor adapted to receive the call signaling, to process the call signaling to select a first connection and a second connection, to transport a first control message that designates the selected first connection, and to transport a second control message that designates the selected second connection, wherein the first selected connection comprises a virtual path over a broadband path, the virtual path being provisioned over the broadband path in the broadband system, and wherein the selected second connection connects to the second communication device;

a first interworking unit adapted to receive the user communications in a communication format, to receive the first control message from the signaling processor, to convert the user communications to asynchronous transfer mode cells that identify the selected first connection designated in the first control message, and to transport the asynchronous transfer mode cells;

a first cross connect adapted to receive the asynchronous transfer mode cells from the first interworking unit and to cross connect the asynchronous transfer mode cells to the virtual path for the selected first connection;

a first add/drop multiplexer adapted to receive the asynchronous transfer mode cells from the first cross connect and to add the asynchronous transfer mode cells to the broadband path for the selected first connection;

a second add/drop multiplexer adapted to receive the asynchronous transfer mode cells on the broadband path and to drop the asynchronous transfer mode cells from the broadband path;

a second cross connect adapted to receive the asynchronous transfer mode cells from the second add/drop multiplexer and to cross connect the asynchronous transfer mode cells according to the provisioned virtual path; and a second interworking unit adapted to receive the asynchronous transfer mode cells from the second cross connect, to receive the second control message from the signaling processor, to convert the asynchronous transfer mode cells to user communications having a communication format, and to transport the user communications to the second communication device over the selected second connection.

42. The system of claim 41 wherein the broadband system comprises a synchronous optical network system.

43. The system of claim 42 wherein the asynchronous transfer mode cells are mapped to synchronous optical network frames in the interworking unit, and wherein the interworking unit transports the asynchronous transfer mode cells contained in the synchronous optical network frames.

44. The system of claim 41 wherein the broadband system comprises a synchronous digital hierarchy system.

45. The system of claim 44 wherein the asynchronous transfer mode cells are mapped to synchronous digital hierarchy frames in the interworking unit, and wherein the interworking unit transports the asynchronous transfer mode cells contained in the synchronous digital hierarchy frames.

46. A system for connecting a call in a broadband system, the call having user communications and call signaling, the system comprising:

a signaling processor adapted to receive the call signaling, to process the call signaling to select a connection, and to transport a control message that designates the selected connection, wherein the selected connection comprises a virtual path over a broadband ring in the broadband system, the virtual path being provisioned over the broadband ring, and to select a second connection;

a broadband interface adapted to receive the user communications in a communication format, to receive the control message from the signaling processor, to interwork the user communications to asynchronous transfer mode cells that identify the selected connection, to map the asynchronous transfer mode cells to broadband frames, and to transport the broadband frames on the provisional virtual path over the broadband ring;

a second broadband interface adapted to receive the broadband frames from the virtual path of the broadband ring and to remove the broadband frames from the broadband ring and comprising a second add/drop multiplexer adapted to drop the broadband frames from the broadband ring, a second cross connect adapted to provision the virtual path from the broadband ring through the add/drop multiplexer, and a second interworking unit adapted to receive the broadband frames from the add/drop multiplexer through the second cross connect, to receive the second control message from the signaling processor, to map the broadband frames to the asynchronous transfer mode cells, to convert the asynchronous transfer mode cells to the user communications having a second communication format, and to transport the user communications over the selected second connection.

47. The system of claim 46 wherein the broadband interface comprises:

an add/drop multiplexer adapted to provide the call access to the broadband ring;

a cross connect adapted to provision the virtual path through the add/drop multiplexer over the broadband ring;

an interworking unit adapted to receive the control message from the signaling processor and, in response, to interwork the user communications for the call to asynchronous transfer mode cells that identify the selected connection, to map the asynchronous transfer mode cells to broadband frames, and to transport the broadband frames over the selected connection;

wherein the selected connection is provisioned by the cross connect from the interworking unit through the add/drop multiplexer over the broadband ring.

48. The system of claim 46 further comprising a communication device adapted to transport the call signaling to the signaling processor and to transport the user communications to the broadband interface.

49. The system of claim 46 further comprising a communication device adapted to receive the user communications in the second communication format from the second interworking unit over the selected second connection.

50. The system of claim 46 wherein the broadband system comprises a synchronous optical network system.

51. The system of claim 46 wherein the broadband system comprises a synchronous digital hierarchy system.

* * * * *